United States Patent [19]

Breen et al.

[11] 4,388,697

[45] Jun. 14, 1983

[54] VOICEBAND DATA SET CIRCUITRY WITH DUAL BUS ARCHITECTURE

[75] Inventors: Robert N. Breen, Lanoka Harbor; Henry R. Goldenberg, Howell, both of N.J.

[73] Assignee: Bell Telephone Laboratories, Incorporated, Murray Hill, N.J.

[21] Appl. No.: 184,929

[22] Filed: Sep. 8, 1980

[51] Int. Cl.³ .............................................. G06F 1/00
[52] U.S. Cl. ....................................... 364/900; 375/8
[58] Field of Search ................... 375/7, 8, 36; 370/85–96; 371/8, 12, 68; 364/200 MS File, 900 MS File

[56] References Cited

U.S. PATENT DOCUMENTS 4,035,777  7/1977  Moreton .............................. 364/200
4,159,882  7/1979  Sanders, Jr. et al. ............ 364/900 X

OTHER PUBLICATIONS

Sherman et al., "System Description of a Programmable Multiple Data Set," *Proc. 1975 Nat. Tele Conf.*, pp. 23-9 to 23-12.

Tanabe et al., "16-Bit Microprocessor With Dual Bus Architecture for Multi-Microprocessor System," *Proc. 1979 Spring Compcon*, pp. 98-101.

MacSorley, "Processor to Processor Final Communications," *IBM T.D.B.*, vol. 22, No. 2, pp. 656-658, Jul. 1979.

*Primary Examiner*—Raulfe B. Zache
*Attorney, Agent, or Firm*—Ronald D. Slusky

[57] ABSTRACT

A full duplex, synchronous data set (10) includes primary signal processing circuitry which generates a modulated transmit data signal in response to serial data from a terminal interface (17). The modulated data signal is transmitted over a primary channel of a transmit line (11). The primary signal processing circuitry also receives modulated data signals from a primary channel of a receive line (12) and recovers therefrom a serial bit stream for presentation to the interface. The operating parameters of the primary signal processing circuitry are specified by a primary controller (30) over a plurality of buses (PA, PC, PD). The primary controller includes a microprocessor (310) and associated peripherals (315, 320, 325, 330, 335). Encoder (115) and decoder (175) circuits within the primary signal processing circuitry are each comprised of a plurality of modules (1310, 1340, 1440, 1460, 1510, 1710, 1835, 1840, 1960, 1980) each designed to perform a specific function. The modules are operated in a selected sequence, with signals passing from one module to the next via a local bus (LEB, LDB).

25 Claims, 17 Drawing Figures

FIG. 1

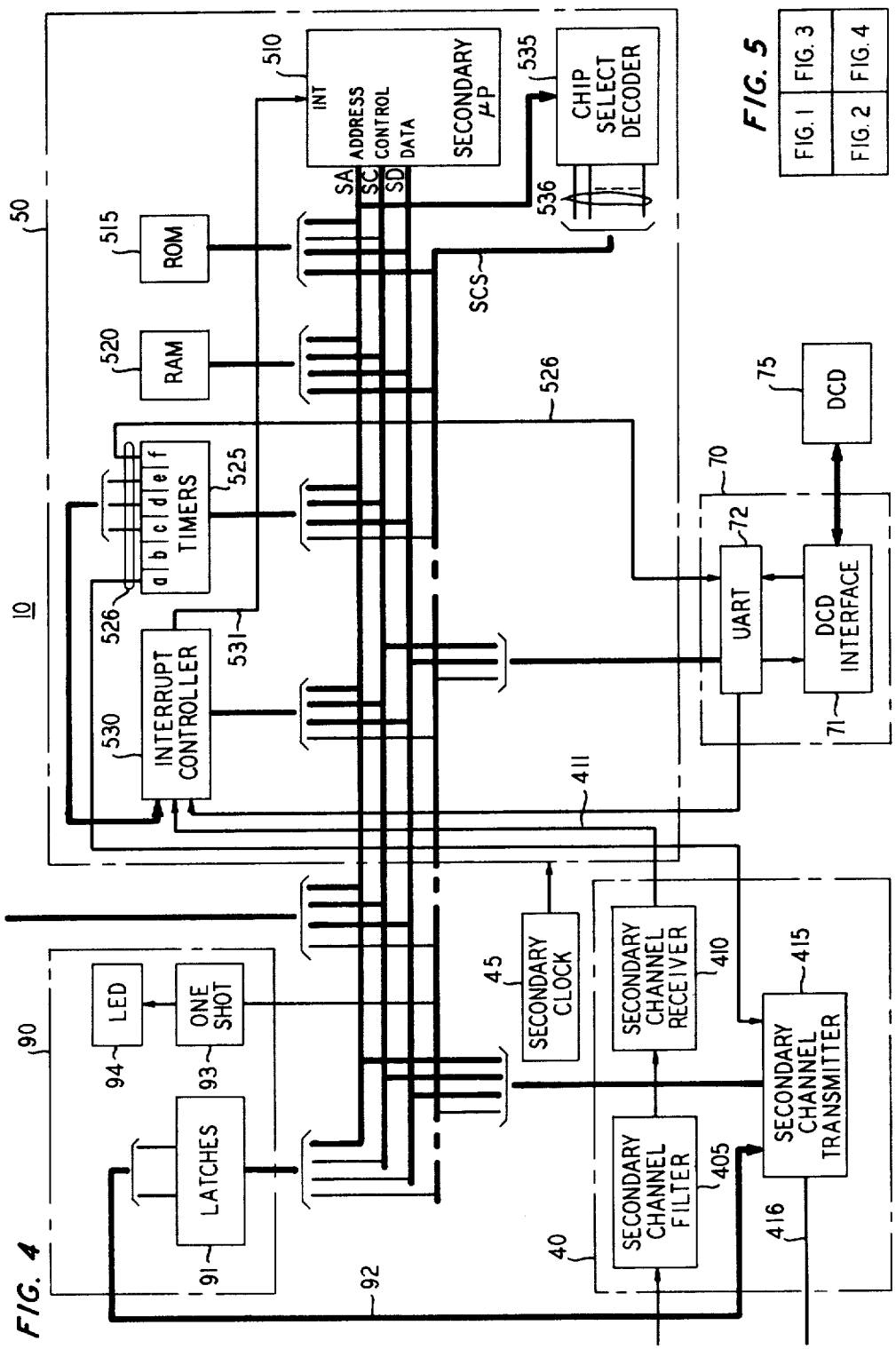

VOICEBAND DATA SET CIRCUITRY WITH DUAL BUS ARCHITECTURE

BACKGROUND OF THE INVENTION

The present invention relates to the transmission of data and, in particular, to data sets.

Workers in the data transmission art, particularly in the area of voiceband data transmission, have suggested various data set, or modem, designs which, in some way, operate under programmed processor, e.g., microprocessor, control. One advantage of such processor-based data sets is that the data set design can be updated relatively inexpensively via program modification both during development of the design and after full-scale manufacturing has begun. Another advantage is that the data set can, with relative ease, be designed to operate with, for example, a number of signaling rates and modulation formats. Moreover, incorporating a programmed processor into the design makes it economically feasible to provide the data set with sophisticated features, particularly in the area of data set and network diagnostics.

The present invention is useful principally in processor-based data sets of a type in which the real-time processing of user-provided data and/or received data signals is performed by special-purpose signal processing circuitry. The signal processing circuitry, more particularly, is capable of operating, for example, in accordance with various operating parameter values, such as carrier frequency and bit rate. It is also capable of operating in accordance with various signal processing formats, such as scrambler/descrambler and differential encoding/decoding algorithms and modulation formats. The data set further includes a controller at the heart of which is a programmed processor. The data set controller writes information signals into various registers (signal holding circuits) within the signal processing circuitry via a primary data bus, those information signals specifying the particular operating parameters and signal processing formats which are to be used at any given time by the signal processing circuitry. The data set controller is also capable of reading information from various registers to, for example, monitor the operation of the signal processing circuitry.

The capability of the signal processing circuitry to operate at different times in accordance with various operating parameter values and signal processing formats is advantageous in that it allows the same signal processing circuitry and overall data set architecture to be used in a family of data sets, i.e., data sets which operate at various speeds and in accordance with various Bell System, CCITT, or other formats. This capability may also be used to advantage to, for example, effect the changes in data set operation attendant to transitions between start-ups, normal data transmission and recovery, and turn-offs.

SUMMARY OF THE INVENTION

In accordance with the present invention, at least a portion of the signal processing circuitry is comprised of a plurality of modules, each designed to perform at least one specific function. The modules operate in a selected sequence, with signals passing from one module to the next via a local data bus which is distinct from the above-mentioned primary data bus.

At least some of the modules are capable of performing their functions in accordance with a plurality of predetermined formats. In the present illustrative embodiment, for example, one module performs the so-called differential encoding function and is capable of encoding signals in accordance with both Bell System and CCITT differential encoding algorithms for 2400, 4800 and 9600 bit per second (bps) transmission, as well as in accordance with various Bell System and CCITT fallback differential encoding algorithms. The particular format to be actually used by each module to perform a given function is specified by the data set controller by writing appropriate information signals into various registers associated with the modules.

Illustratively, the sequence in which the modules operate is controlled by a local controller. The latter is microprogrammed and, illustratively, is capable of operating in response to a plurality of microprograms. The particular microprogram to be used at any given time is, again, specified by the data set controller via an information signal provided over the primary data bus.

In accordance with a feature of the invention, at least some of the registers associated with the modules are double buffered. This allows the data set controller to write into and read from the registers without having to keep track of where the local controller is in its processing cycle.

The invention is illustratively embodied in encoder and decoder circuits within the signal processing circuitry.

BRIEF DESCRIPTION OF THE DRAWING

The invention will be clearly understood from a consideration of the following detailed description and accompanying drawing in which:

FIGS. 1–4, when arranged as shown in FIG. 5, show a voiceband data set which includes signal processing circuitry embodying the principles of the invention;

DETAILED DESCRIPTION

Figure 1:
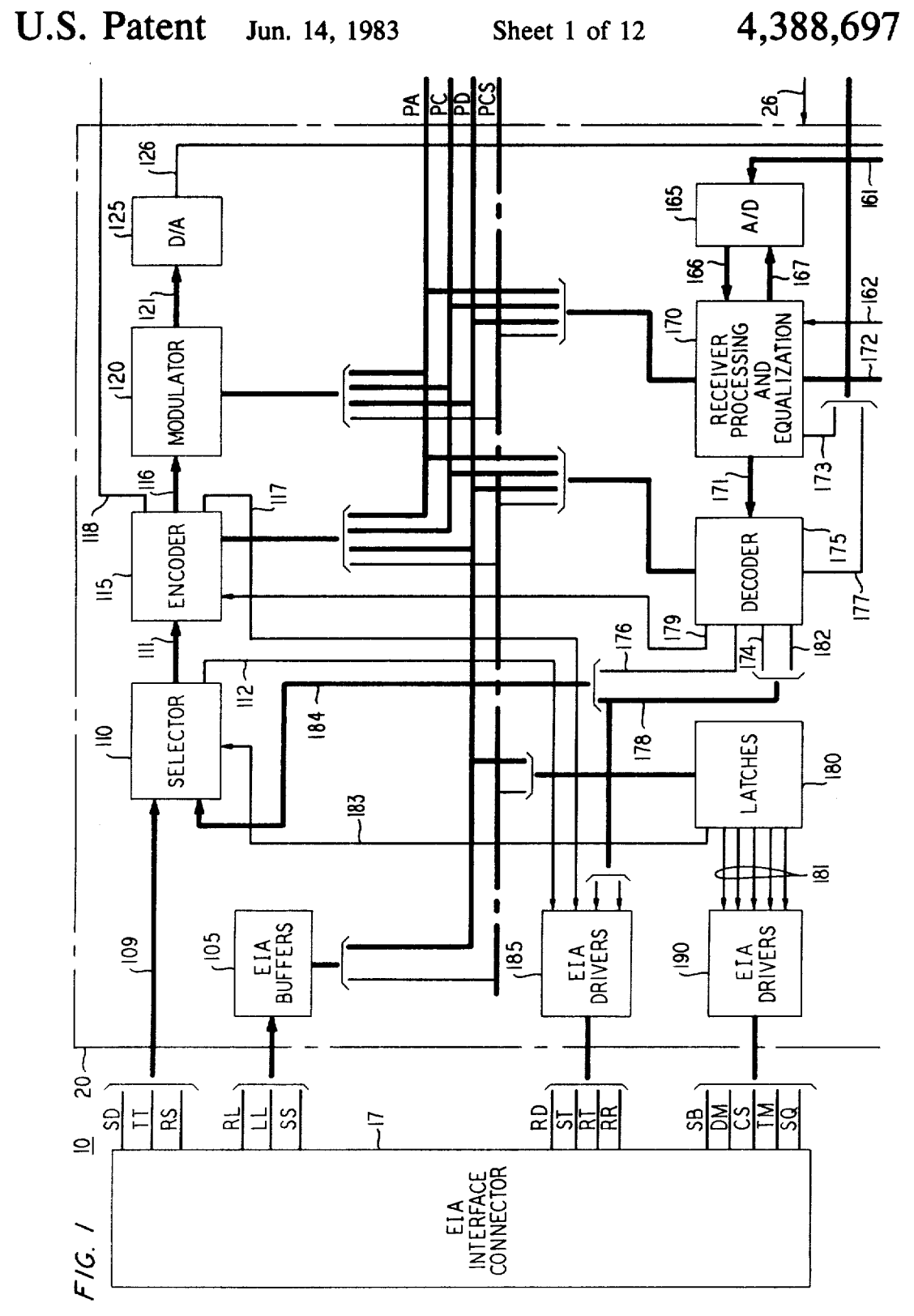
Figure 2:
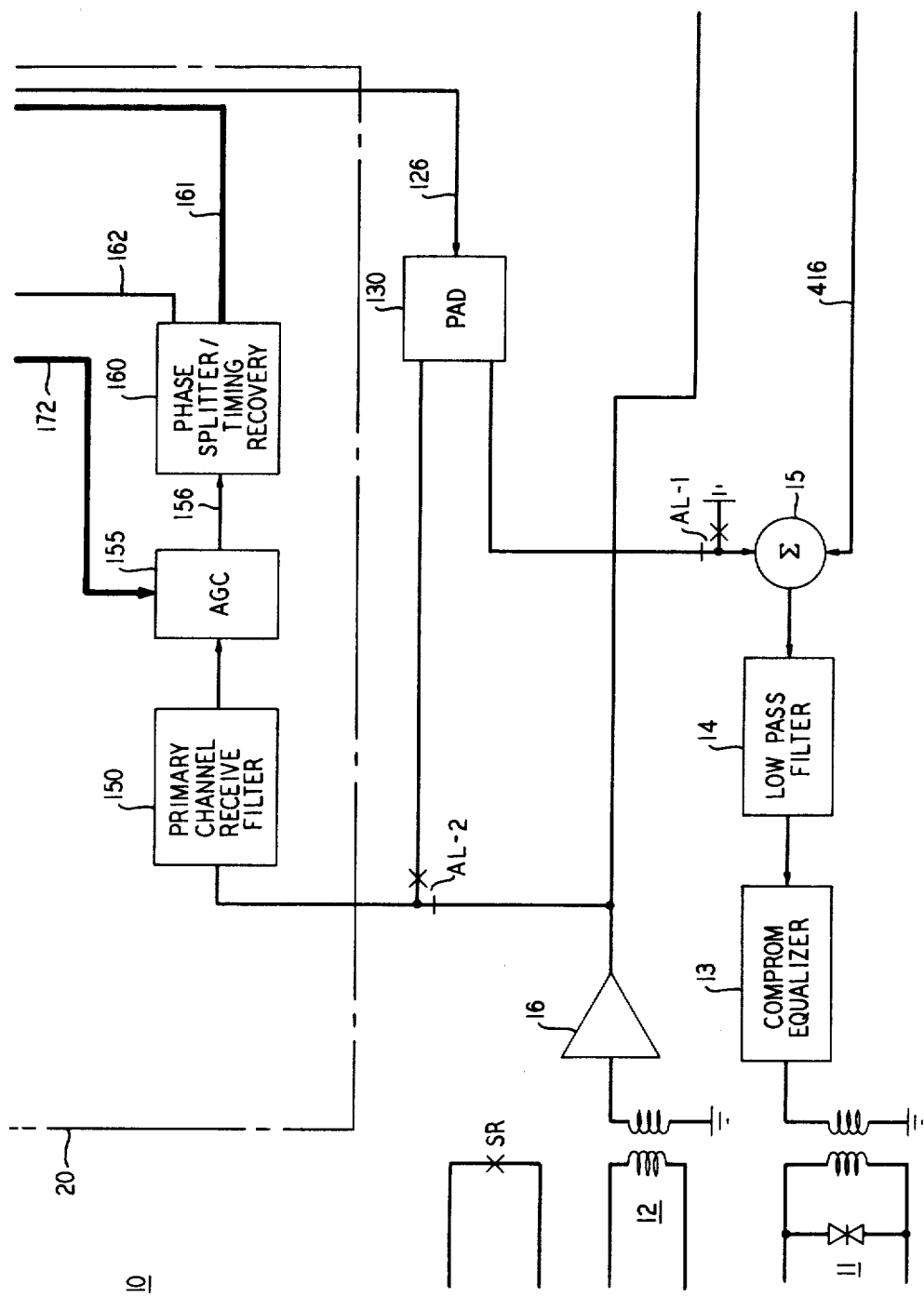
Figure 3:
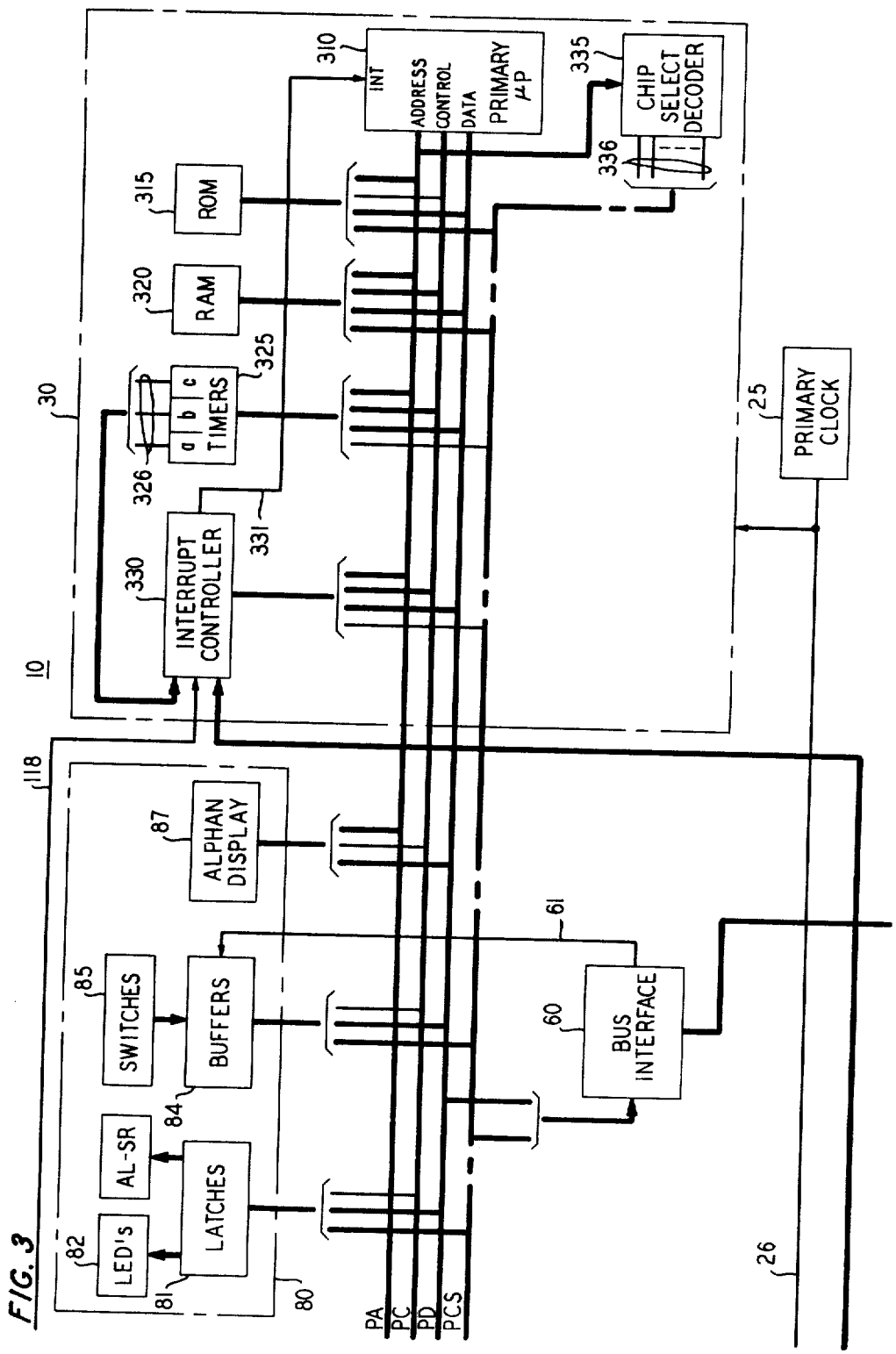
Figure 6:
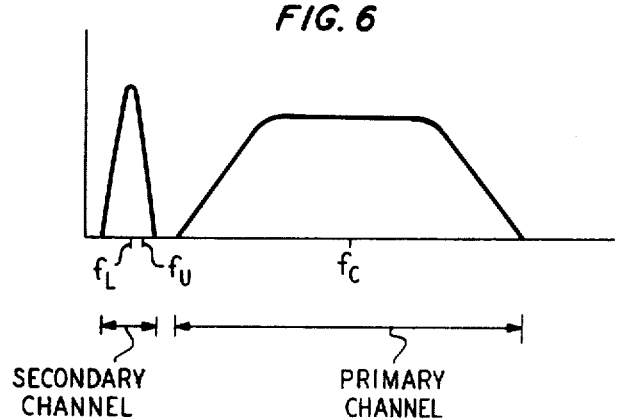
FIG. 6 shows the division of the bandwidth over which the data set operates into primary and secondary channels.

FIGS. 1–4, when arranged as shown in FIG. 5, depict a full duplex, synchronous data set 10. Data set 10 is illustratively a control data set connected to a tributary data set of similar design (not shown) via a four-wire private line comprised of a two-wire transmit line 11 and a two-wire receive line 12. The bandwidth of both the transmit and receive lines is divided into a primary channel and a secondary channel, as shown in FIG. 6. The primary channel carries modulated data and start-up signals and also various test signals. The secondary channel carries diagnostic and control information between the two data sets.

Data set 10 includes primary and secondary channel circuitries which are associated with communications over the primary and secondary channels, respectively. In particular, the primary channel circuitry is comprised of primary signal processing circuitry 20, primary controller 30 and primary input/output (I/O) circuitry 80. As described in detail hereinbelow under the heading "Encoder and Decoder," a portion of circuitry 20 is comprised of an encoder circuit and a decoder circuit, each of which embodies the principles of the present invention. (The overall functions of the encoder and decoder are, in addition, described under the heading "Primary Signal Processing and I/O Circuitry.")

Circuitry 20 performs the real-time processing of user-provided data and received data signals. As will be described in detail hereinbelow, circuitry 20 receives serial data from the user's terminal equipment (not shown) at 4800 bits per second (bps). This signal is scrambled, encoded and formatted into three-bit symbols. It then modulates a carrier of frequency $f_c$ using 8-phase, phase shift keying (PSK), yielding a baud (symbol) rate of 1600. The modulated transmit data signal is transmitted over the primary channel of line 11. Circuitry 20 also receives PSK data signals from the primary channel of line 12, recovers a 4800 bps far-end data stream therefrom and presents it to the user's terminal equipment. Circuitry 20 is controlled by controller 30, which provides information to circuitry 20 as to how the latter is to perform the real-time signal processing. Controller 30 also controls primary (I/O) circuitry 80. Both circuitry 20 and controller 30 operate in response to a clock signal of approximately 1.8 MHz provided by primary master clock 25 over lead 26.

The secondary channel circuitry, also referred to as the Data Set Diagnostic Unit (DDU), includes secondary signal processing circuitry 40, which is controlled by a secondary controller 50. Controller 50 operates in response to a clock signal, also of approximately 1.8 MHz, provided by secondary master clock 45. Circuitry 40 receives diagnostic and control information from controller 50 and converts it into an FSK signal having upper and lower frequencies $f_U$ and $f_L$. This signal is transmitted over the secondary channel of line 11. In addition, circuitry 40 receives FSK signals from the secondary channel of line 12 and presents a waveform representing the zero crossings of the received signal to controller 50, which recovers the transmitted intelligence.

Controller 50 communicates with controller 30 via a bus interface 60 and communicates with a diagnostic control device (DCD) 75 via diagnostic channel circuitry 70. Controller 50 also controls secondary I/O circuitry 90.

PRIMARY CHANNEL CIRCUITRY—SYSTEM OPERATION

Primary Signal Processing and I/O Circuitry

Primary signal processing circuitry 20 interfaces with the user's terminal equipment via interface connector 17, which is compatible with EIA standard RS-449. Of the interface leads which extend from the user, the SD (send data), TT (terminal timing), and RS (request-to-send) leads extend via cable 109 through selector 110 to encoder 115 via cable 111. (When the data set is in a digital loopback test mode, selector 110 extends to encoder 115 the signals on cable 184 rather than the signals on cable 109).

The transmitter portion of circuitry 20 is principally comprised of encoder 115, modulator 120 and D/A converter 125.

As noted above, encoder 115 comprises a portion of circuitry 20 which embodies the principles of the present invention. It is discussed in detail hereinbelow under the heading "Encoder and Decoder." For present purposes, however, it suffices to say that encoder 115 is a large scale integrated (LSI) circuit which processes the input data from the SD lead in preparation for modulation. This processing includes, for example, the functions of scrambling and differential encoding. The encoder output signal passes over cable 116 to modulator 120—another LSI circuit.

The modulator output on cable 121 is a sequence of digital words representing samples of the PSK modulated signal to be transmitted. These are passed to D/A converter 125. The analog output of the latter on lead 126 is passed through a pad 130 and released transfer contact AL-1 of an analog loopback relay AL to one input of summing amplifier 15. The other input to the summing amplifier is the output of secondary channel transmitter 415 within secondary signal processing circuitry 40. The output of summing amplifier 15 is shaped by a transmit low pass filter 14 whence it passes to a compromise equalizer 13. The latter conditions the outgoing signal to compensate for some of the expected channel degradation. The output of equalizer 13 is extended to transmit line 11.

The received data signal from line 12 is brought into the data set through preamplifier 16. The output of the preamplifier extends to secondary channel processing circuitry 40, as discussed more fully below. The output of preamplifier 16 also extends through released transfer contact AL-2 to the receiver portion of circuitry 20.

In particular, the preamplifier output extends to primary channel receive filter 150. Filter 150 removes the secondary channel signal, passing the primary channel signal to an automatic gain control (AGC) circuit 155. The latter sets the correct levels for proper operation of the circuitry which follows.

In particular, the AGC output passes to phase splitter/timing recovery circuit 160 over lead 156. The timing recovery portion of circuit 160 generates a square wave having transitions which correspond to zero crossings of a baud rate tone extracted from the AGC output signal. This square wave is extended to receiver processing and equalization circuit 170 over lead 162 where it is used to control receiver timing. The phase splitter portion of circuit 160 generates a Hilbert transform signal pair on cable 161 in response to the AGC output signal. The Hilbert transform pair is extended to A/D converter 165 which generates digital versions of the Hilbert transform signals one after the other in serial form on a lead within cable 166.

Cable 166 extends to receiver processing and equalization circuit 170, which is comprised of several LSI circuits. Circuit 170 performs such functions as adaptive equalization, demodulation and data decision formation. It presents (presumably correct) decisions as to the values of transmitted data symbols to decoder 175 over cable 171. It also extends a digital word to AGC 155 over cable 172 specifying the AGC gain. Cable 172 also carries clock signals for AGC 155. Clock signals are also extended to A/D converter 165 over cable 167.

Decoder 175, another LSI circuit, comprises a second portion of circuitry 20 which embodies the principles of the present invention. Like encoder 115, this circuit is discussed in detail hereinbelow. Decoder 175 performs the inverse functions of encoder 115, e.g., diffferential decoding and de-scrambling. Receive timing and receiver ready signals generated by decoder 175 on leads 174 and 182 are respectively extended to the ones of EIA drivers 185 associated with the RT and RR leads of interface connector 17 via cable 178. In normal operation the RD (receive data) lead of connector 17, carrying the recovered far-end data, also receives its signal via one of drivers 185 from decoder 175. This signal is routed to the driver via decoder output lead 176, cable 177, selector 110 and lead 112. The ST (send timing) lead of connector 17 receives its signal from encoder 115 via lead 117 and another one of EIA drivers 185.

In addition to the receive data signal on lead 176, cable 184 carries the receive timing and receiver ready signals from cable 178. During digital loopback tests, the signals on cable 184, rather than the signals on cable 109, are extended by selector 110 to encoder 115, and selector 110 extends ground potential to the one of EIA drivers 185 associated with the RD lead of connector 17.

Other leads of connector 17 include SB (standby), DM (data mode), CS (clear to send), TM (test mode) and SQ (signal quality). These signals are provided by respective ones of EIA drivers 190 via latches 180 and leads 181. (Another one of latches 180 provides a signal to selector 110 via lead 183 indicating whether the data set is to be in the normal or digital loopback mode.)

Figure 7:
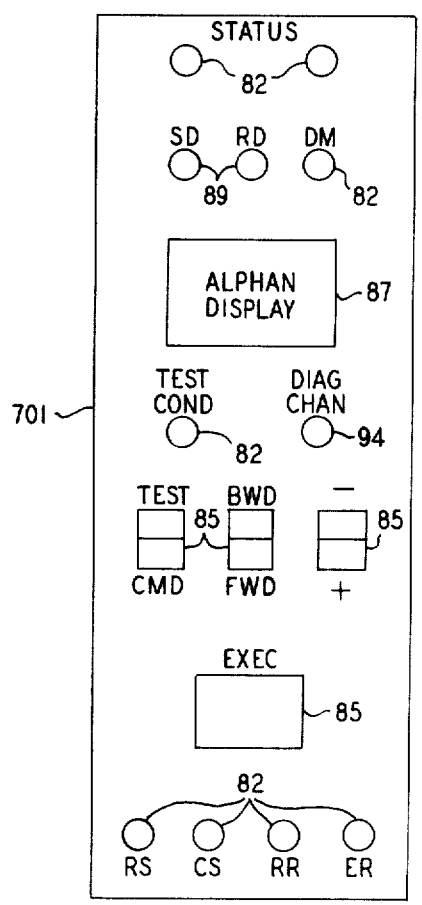
FIG. 7 depicts the front panel of the data set.

Primay I/O circuitry 80 includes a set of latches 81. Individual ones of latches 81 control the states of LED indicators 82 disposed on front panel 701 of the data set, which is shown in FIG. 7. The two status indicators are red and green, respectively. The green indicator is on when both data set 10 and the far end data set are operating normally; otherwise, the red indicator is on. The DM (data mode) indicator is on if the data set is available to carry user-provided data, as opposed to being in a test condition. The TEST CONDition indicator is on when a test which is disruptive of normal communications over the primary channel is in progress. (The DM and TM leads of interface 17 are raised when these indicators are on.) The RS, CS and RR indicators show the state of the corresponding EIA interface leads. The ER indicator is on when data set equalizer is in a retrain mode. (SD and RD indicators 89 of panel 701 are driven directly from the corresponding EIA interface leads via buffers not shown. Diagnostic channel indicator 94 is controlled by secondary channel circuitry.)

Other ones of latches 81 control various relays in the data set, such as analog loopback relay and a select standby relay SR.

I/O circuitry 80 also includes a set of buffers 84 through which the positions of various front panel switches 85 can be read. These are operated by the user to issue commands to the data set and to request that it perform various tests on itself and/or the network to which it is connected. Other ones of switches 85 (not shown in the drawing) define a local address for the data set. When diagnostic control device (DCD) 75 is associated with a number of data sets co-located with data set 10, this local address provides the DCD with a way of directing its communications to data set 10. In addition, signals from bus interface 60 can also be read through ones of buffers 84.

I/O circuitry 80 also includes a four-character alphanumeric display 87. When data set or network faults are detected, the display is used to indicate their nature to the user. In addition, the data set uses display 87 to present mnemonics for the tests and commands which the user can order the data set to execute. It also uses the display to present test results, for example, in the form of a word (PASS) or a measurement (03DB).

Primary Controller

Primary controller 30 includes a microprocessor 310 and associated peripherals including read only memory (ROM) 315, random access memory (RAM) 320, timer circuitry 325, interrupt controller 330 and chip select decoder 335. Controller 30 communicates with its peripherals and the rest of the data set by writing information into, and reading information out of, registers, buffers and/or latches throughout the data set. This communication is carried out via three buses—primary address bus PA, primary control bus PC, primary data bus PD—and a primary chip select cable PCS.

The leads 336 of cable PCS are derived by chip select decoder 335 from a subset of the address bus leads. The leads of cable PCS extend to various integrated circuit chips or groups of chips (e.g., ROM 315) within the data set. When it is desired to communicate with a particular device, i.e., register, buffer or latch, microprocessor 310 provides on bus PA an address unique thereto. Decoder 335 provides a signal on an appropriate one of leads 336 indicating that the controller wishes to communicate with the device in question. If more than one device is associated with a particular chip select lead, the particular circuit desired to be communicated with is indentified by an address on bus PA.

Data bus PD is a bidirectional 8-bit bus over which the information itself is carried. Control bus is a two-bit bus having a read lead and a write lead. Activation of the write lead means that information provided on bus PD is to be written in a register or latch which has been addressed. Activation of the read lead means that information is to be provided on bus PD by the register or buffer which has been addressed.

Not all leads of all buses extend to each circuit with which controller 30 communicates. For example, latches (buffers) receive only the write (read) lead of the control bus. In addition, the various integrated circuits comprising the data set may receive less than the full number of address leads, depending on the number of addressable elements contained therein.

Some of the functional blocks shown in FIGS. 1-4, e.g., latches 81 and bus interface 60, receive more than one chip select lead, as indicated by a cable, rather than a lead, tap off of chip select cable PSC. Buffers used to drive the three buses and cable PSC are not shown in the drawing.

Figure 8:
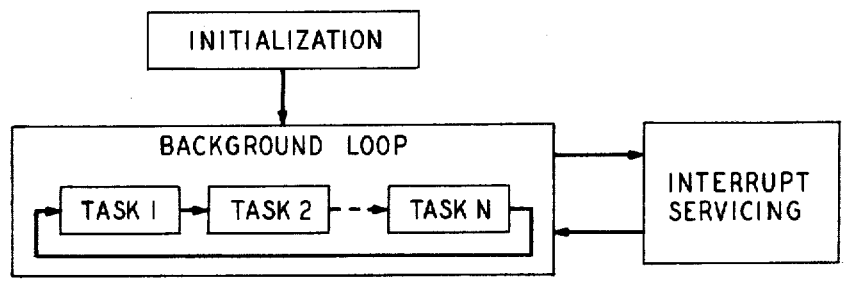
FIG. 8 shows the overall sequence of operations performed by a controller within the data set.

The overall operation of controller 30 is depicted in FIG. 8. Firstly, controller 30 initializes itself and the rest of the data set. It then enters a background loop in which it repetitively performs a number of predetermined background "tasks" related to the management and monitoring of off-line data set operations and the monitoring of both off-line and real-time operations. (One pass through the background loop requires about 15 ms.) Operations of the controller which relate to the control of the real-time signal processing (as well as some other operations) are handled on an interrupt basis. Interrupts are generated, for example, in response to various signal events within circuitry 20. As a particular example, an interrupt is generated by encoder 115 when the RS (request-to-send) lead is raised by the user's terminal equipment. The reception of an interrupt causes controller 30 to suspend its execution of the background loop and to service the interrupt via an appropriate interrupt service routine.

The interrupt service routine causes controller 30 to write into respective registers of circuitry 20 various operating mode, operating parameter and/or signal format information signal values appropriate to the type of interrupt generated. For example, in the case of an interrupt generated by a raising of the RS lead, controller 30 performs operations such as configuring encoder 115 for start-up, turning on modulator 120, loading (jamming) ideal reference (start-up) data into encoder 115, configuring encoder 115 for normal operation, and raising the CS (clear-to-send) lead.

Once an interrupt service routine (or any phase thereof which is separated from the following phase by a significant time interval) is completed, controller 30 returns to the background loop at the place where it left.

Primary Controller Operation-Initialization/Background Loop

Controller 30 is controlled by a set of initialization routines in ROM 315 when power is applied to the data set. During initialization, various pointers within the microprocessor are set and various registers within the microprocessor are cleared. Latches, such as latches 180, are set to predetermined (e.g., cleared) states. In addition, numerous operating mode signals held in registers within the data set—principally within circuitry 20—are set to predetermined initial values. These include, for example, a signal which specifies the state (on and off) of the modulator, signals which specify the signal sources for the encoder and decoder, signals which specify various operating modes for the equalizer, etc.

A further initialization function is to specify various operating parameter values and signal processing formats for the LSI circuits of circuitry 20. Although data set 10 operates with 8-phase PSK having predetermined differential encoding and scrambling, predetermined carrier frequency, predetermined start-up protocols, etc., circuitry 20 is capable of operating in accordance with various operating parameters and signal processing formats. For example, modulator 120 is capable of implementing (a) phase shift keying (PSK) using 100 percent excess bandwidth at 1200 baud, (b) PSK using 50 percent excess bandwidth at 1600 baud and (c) quadrature amplitude modulation (QAM) using 12 percent excess bandwidth at 2400 baud. It can operate over a wide range of carrier frequency. Encoder 115 is capable of implementing any of a number of scrambling and differential encoding algorithms and QAM signal constellations. Receiver processing and equalization circuit 170 and decoder 175 are similarly flexible.

At this time, then, the encoder and decoder receive information as to the scrambling/descrambling and differential encoding/decoding algorithms to be initially used, i.e., during transmitter and receiver start-up. These may be changed later as, for example, when transition is made from transmitter start-up to normal transmitter operation. Modulator 120 and receiver processing and equalization circuit 170 receive information as to which of the three above-mentioned modulation formats are to be used (in this case, format (b)) and also what the carrier frequency is—illustratively 1800 Hz.

Figure 9:
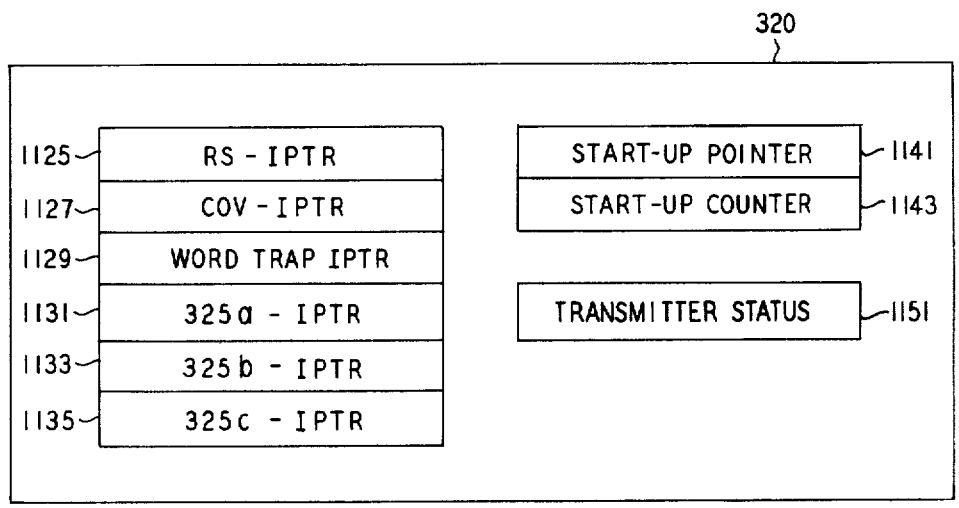
FIG. 9 depicts a portion of a random access memory within the data set controller.

Various random access memories are also loaded during initialization. These include, in accordance with a feature of the invention, random access memories within encoder 115 and decoder 175 which hold microcoded program instructiions under the control of which the encoder and decoder operate. Also initialized are all of the numerous variables stored in RAM 320, a number of which, shown in FIG. 9, are discussed below.

When initialization is complete, the controller enters the background loop and sequentially performs the above-mentioned background tasks.

For example, in a so-called background diagnostic task, controller 30 reads an ID word stored in a particular register in each of the LSI circuits of circuitry 20. The value of each ID word, as read, is compared to the known value thereof stored in ROM 315. The ability of controller 30 to retrieve the proper ID word from each LSI circuit is a good indication that at least a considerable portion of the controller 30 bus structure is functioning properly. It is also one indication that the LSI circuits are themselves operational and that the proper LSI circuit was inserted in the proper place during data set manufacture. The background diagnostic task may also include other checks on the integrity of the data set circuitry. Upon failure of any of these diagnostic checks, front panel status indicators 82 are switched to red on/green off and a mnemonic for the fault is presented on display 87.

Another task is a modem operational task, which is principally comprised of a number of so-called consistency checks. For example, the state of the RS (request-to-send) lead, which can be read from encoder 115, is compared with a transmitter status word 1151 within RAM 320. The transmitter status word indicates whether the transmitter circuitry is, for example, off, on, in start-up or in turn-off. If the RS lead and transmitter status word are inconsistent, the controller initiates a transmitter turn-on or turn-off in accordance with the RS lead signal. The modem operational task also performs a streaming check if the data set has been optioned for same. In accordance with this check, the time over which the RS lead remains high is monitored. If it exceeds a predetermined value, the modulator is turned off and, again, an indication of the fault is presented on front panel 701.

A set of tasks referred to as the EIA tasks involve the monitoring of various leads to which the data set is connected. One EIA task monitors the status of various leads of EIA interface connector 17 and upon detecting transitions, takes appropriate action. For example, upon detecting via one of EIA buffers 105 that the LL (local loopback) or RL (remote loopback) lead has been raised by the user's terminal equipment, this EIA task initiates the relevant test. Similarly, upon detecting via another one of buffers 105 that the SS (select standby) lead has been raised, this task causes relay SR to close. The resulting closure of relay contact SR indicates to back-up circuitry associated with data set 10 that the latter is to be connected to a back-up transmission channel. The SB lead would also be raised at this time, indicating that the back-up channel is in use.

So-called communication control tasks relate to communications between the data set and the user, including, for example, the scanning of switches 85, activation of status indicators 82 and the control of display 87. Another communication control task oversees the running of data set and network tests.

Primary Controller Operation-Interrupts

As previously mentioned, execution of the background loop continues indefinitely until controller 30 receives an interrupt. Within the controller, interrupts are received by microprocessor 310 via lead 331. Interrupts originate from several places within circuitry 20 and are generated in response to various signal events within that circuitry. The previously mentioned request-to-end interrupt, for example, is generated by encoder 115 on lead 118 when the user's terminal equipment raises or lowers the RS lead. Receiver processing and equalization circuit 170 generates an energy detect (COV) interrupt on lead 173 when signal energy appears on, or disappears from, cable 166. Decoder 175 generates a word trap match interrupt on lead 177 when a particular received data word, such as a synchronization word, is determined to have been received.

In addition, interrupts are generated on leads 326 by respective ones of three timers 325a, 325b and 325c within timer circuitry 325. Each of these timers is programmed by microprocessor 310 to operate principally in one of two modes. In the so-called divide-by-N mode, the timer will generate an interrupt for every N pulses from a respective clock signal, where N is a number specified by the microprocessor over data bus PD. In a monostable mode, the timer provides a single interrupt after a predetermined number of clock pulses (again specified by the microprocessor) have occurred. Timers 325a and 325b are used principally in connection with transmitter and receiver operations, respectively. Timer 325c is a general purpose timer. Although not shown in the drawing, timers 325a, 325b and 325c respectively receive their clock signals from encoder lead LSC, one of decoder leads 1918 and encoder lead NDR, which leads are discussed below.

When microprocessor 310 receives an interrupt from interrupt controller 330 over lead 331, it determines the source of the interrupt by interrogating interrupt controller 330 and then transfers control to an appropriate interrupt service routine within ROM 315.

Two or more interrupt service routines may be associated with some types of interrupts, such as the request-to-send and energy detect interrupts. For example, one request-to-send interrupt service routine is to be invoked when the data set is optioned for continuous carrier transmission, and a different one is to be invoked if the data set is optioned for switched carrier transmission. The particular interrupt service routine to which control is to be transferred in response to a particular type of interrupt is determined in the background. The starting address of that routine is stored in an interrupt pointer—a particular location in RAM 320 associated with the type of interrupt in question. As shown in FIG. 9, RAM 320 thus includes request-to-send, energy detect (COV) and word trap match interrupt pointers 1125, 1127 and 1129, respectively, and timers 325a, 325b and 325c interrupt pointers 1131, 1133 and 1135, respectively. Upon determining from interrupt controller 330 what type of interrupt was received, the appropriate interrupt pointer is read and control is transferred to the address stored therein.

By way of example, a detailed description of the operations performed by controller 30 in servicing a request-to-send interrupt will now be given.

The first operation of the routine is to determine from encoder 115 the state of the RS (request-to-send) lead. This is necessary because a request-to-send interrupt is generated both when the RS lead is raised by the user's terminal equipment and when it is dropped and different operations are to be performed, depending on which of these has occurred. For the present example, it is assumed that the RS lead has been raised, indicating that the terminal equipment has data which it wishes to transmit.

The request-to-send interrupt service routine then enters its first phase. In this phase, it first sets timer 325a to a divide-by-N mode such that interrupts will be generated by the timer every other symbol interval in alignment with the baud clock which is generated by encoder 115 and which is readable by controller 30 over the data bus. In addition, the starting address of the next phase of the routine, which is to be executed when 325a timer generates its next interrupt, is stored in timer 325a interrupt pointer 1131. In addition, the RS indicator on front panel 701 is turned on via the corresponding one of latches 81.

Further operations in the first phase include writing information into various registers within encoder 115 and modulator 120. This includes, for example, setting a bit in the modulator indicating that the modulator is to be on. In addition, information is written into encoder 115 to indicate that ideal reference (start-up) data (which is to be encoded and passed on to modulator 120 during start-up) will be being loaded into encoder 115 every other symbol interval, with ideal reference data for two symbol intervals being loaded each time. Indeed, ideal reference data for the first two start-up symbol intervals was already loaded into encoder 115 as part of the most recently executed transmitter turn-off routine. Other information loaded into the encoder by the turn-off routine includes information relating to the differential encoding algorithm to be used during start-up, and a program counter word indicating the address within the encoder RAM of the program which defines the order of operations to be performed by the encoder during start-up.

Information is also loaded into encoder 115 which inhibits operation of the initial portion of the scrambler circuit—the so-called prescrambler. In addition, certain variables are set up in RAM 320. For example, the above-mentioned transmitter status flag 1151 is set to indicate that the data set is, in fact, in transmitter start-up; a start-up pointer 1141 is set to the address in ROM 315 which holds the ideal reference data for the next two symbol intervals; a start-up counter 1143 is initialized to a count equal to the number of times the ideal reference data loading operation is to be performed. Control is then transferred back to the background loop.

The ideal reference data previously loaded into encoder 115 is encoded and transmitted by encoder 115 and modulator 120 during the next two symbol intervals. Timer 325a thereafter times out, thereby generating an interrupt, and causing control to be transferred to the next phase of the interrupt service routine, identified by the contents of interrupt pointer 1131. At this time, the routine reads start-up pointer 1141; reads from the ROM location whose address is stored in the start-up pointer the ideal reference data for the next two symbol intervals; loads that data into encoder 115; increments start-up pointer 1141 so that it points to the next ideal reference word; decrements start-up counter 1143 and then examines the contents of the counter. Assuming that the start-up counter value is non-zero, return is made to the background. Timer 325a generates an interrupt two symbol intervals later and the process repeats.

When the contents of start-up counter 1143 are found to be zero, timer 325a interrupt pointer 1131 is set to the address of the next phase of the routine and return is made to the background only after the operation of timer 325a is modified to time a 12-baud interval. The structure of timer circuitry 325 is such that before timing the 12-baud interval, timer 325a will operate for one more cycle in accordance with its previous mode of operation. Thus, two symbol intervals later, timer 325a generates another interrupt, and control transfers to the next phase of the interrupt service routine. In this phase, information is loaded into encoder 115 indicating that scrambled marks must now be transmitted by clamping the SD (send data) lead low. In addition, the encoder program counter is now set to that portion of the encoder microcode defining the order of operations for normal, transmitter on, operation. Information indicating the type of differential endoding to be used during normal, as opposed to start-up, operation is also communicated to the encoder. Control is then returned to the background. In addition, timer interrupt pointer 1131 is set to the address of the last phase of the routine.

Twelve symbol intervals later, timer 325a generates its last interrupt, and control transfers to the last phase of the routine. At this time the SD lead is unclamped; the prescrambler is enabled; the CS (clear-to-send) lead is raised; the CS (clear-to-send) indicator 82 is turned on; transmitter status word 1151 is set to indicate "transmitter"; and timer 325a is turned off.

The interrupt service routines associated with the energy detect and word trap match interrupts are similarly comprised of instructions which implement the appropriate data set operations for the interrupt in question. For example, the word trap match interrupt is used in the course of various, e.g., end-to-end, tests. The principal job of its associated interrupt service routine is to initiate the first phase of various routines which take advantage of the word trap capability of the data set.

ENCODER AND DECODER

General

Figure 10:
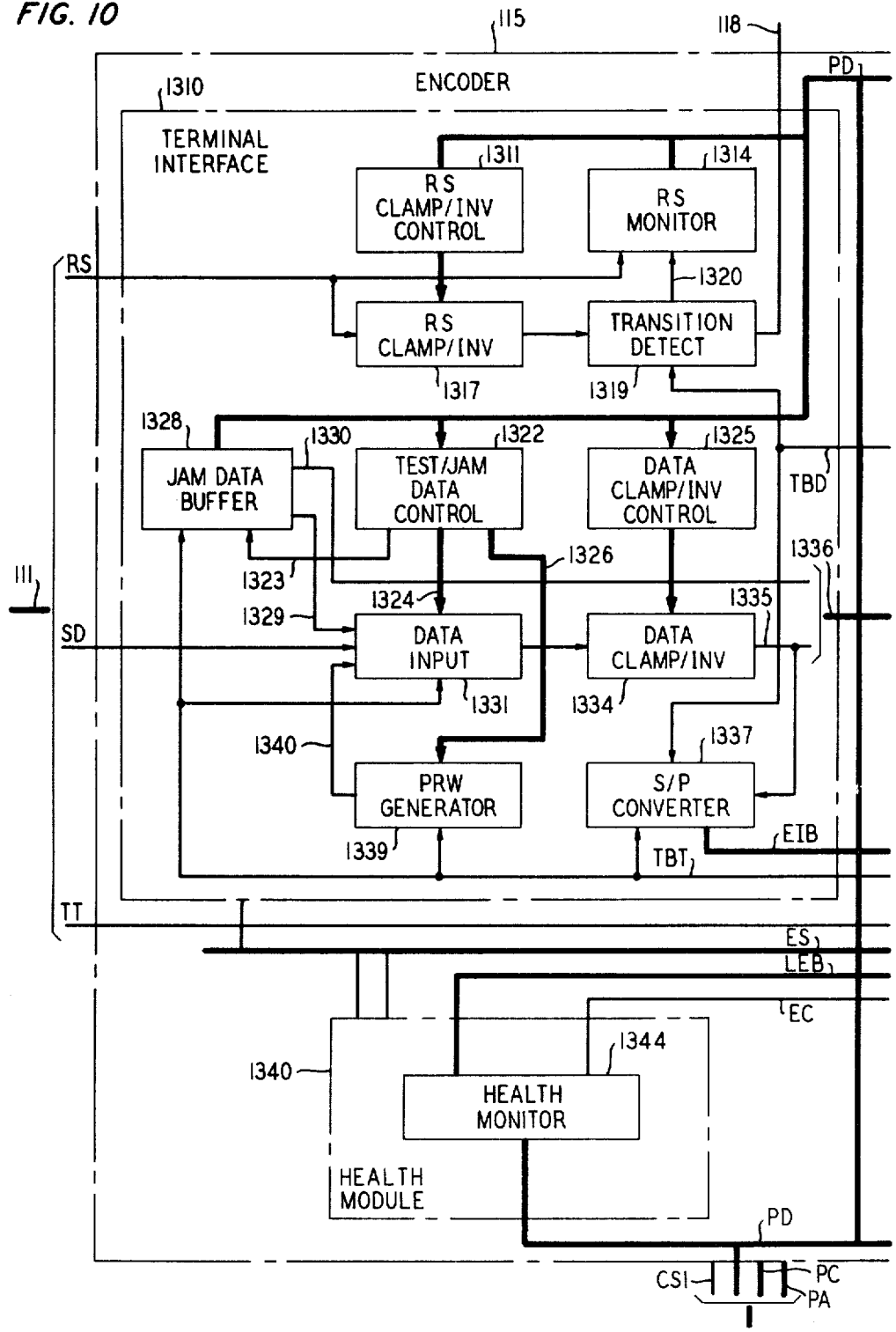
FIGS. 10–12, when arranged as shown in FIG. 13, show an encoder which is used in the above-mentioned signal processing circuitry and which embodies the principles of the present invention.
Figure 11:
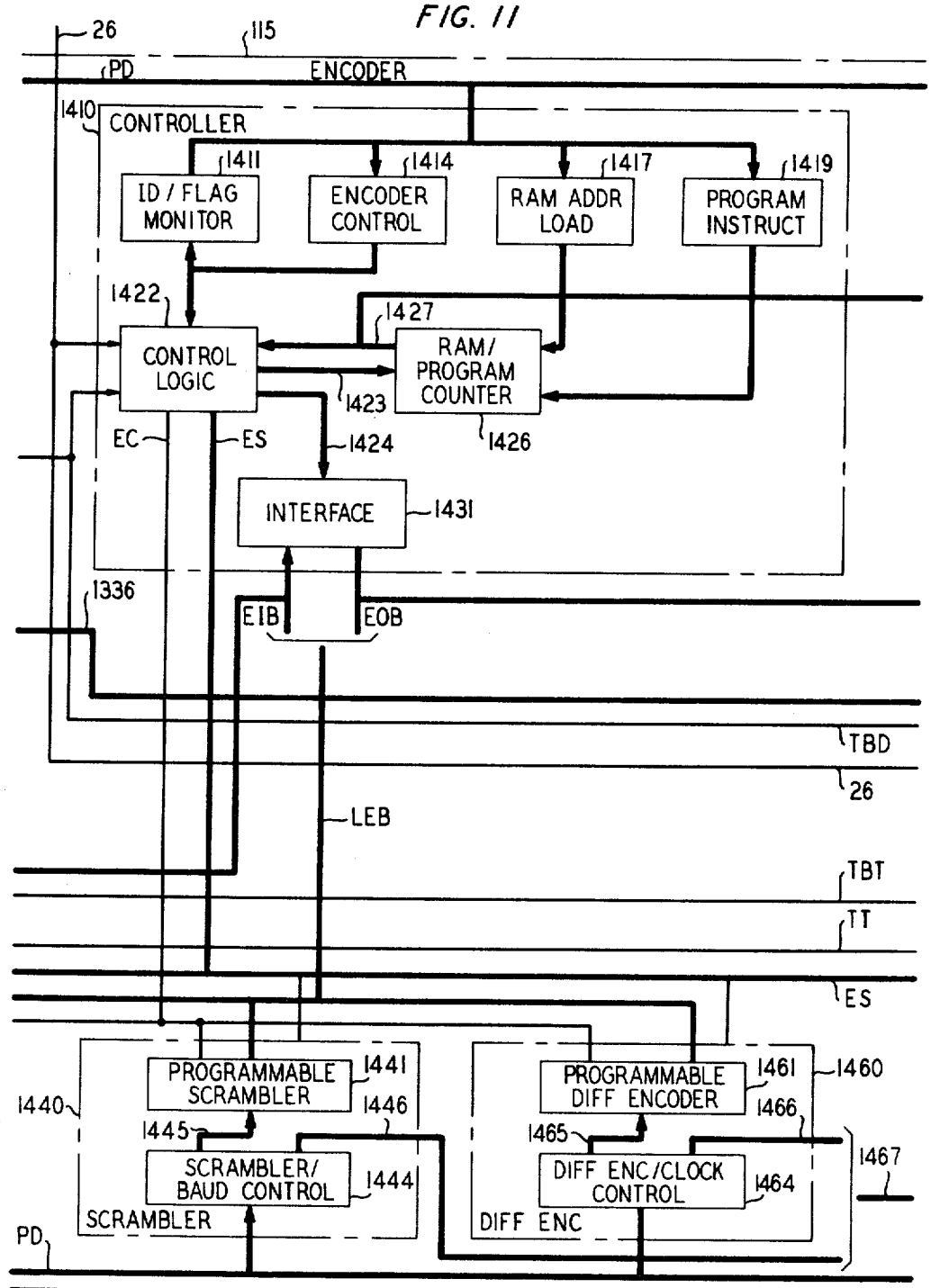
Figure 12:
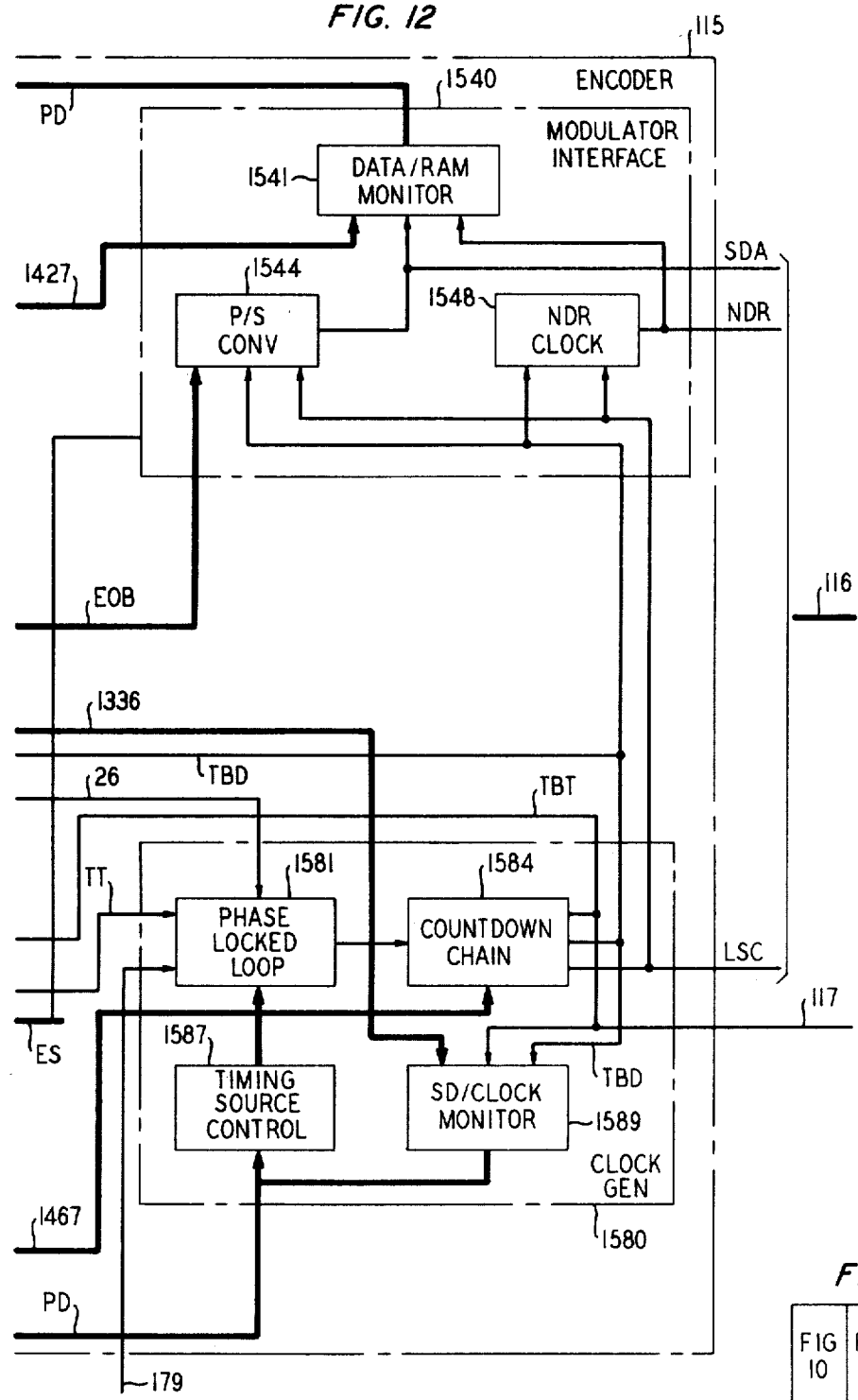
Figure 13:
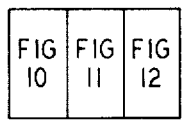
Figure 14:
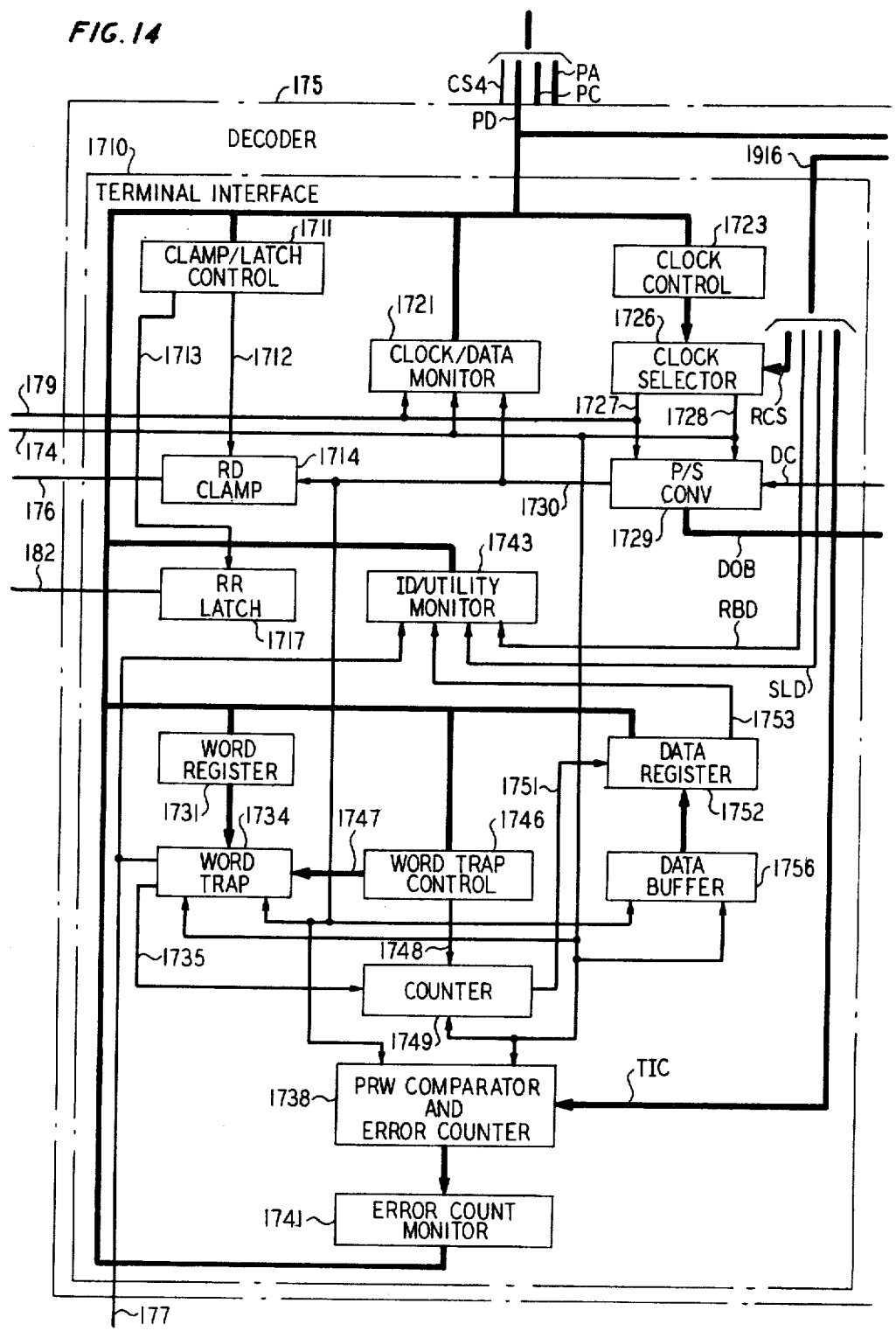
FIGS. 14–16, when arranged as shown in FIG. 17, show a decoder which is used in the above-mentioned signal processing circuitry and which embodies the principles of the present invention.
Figure 15:
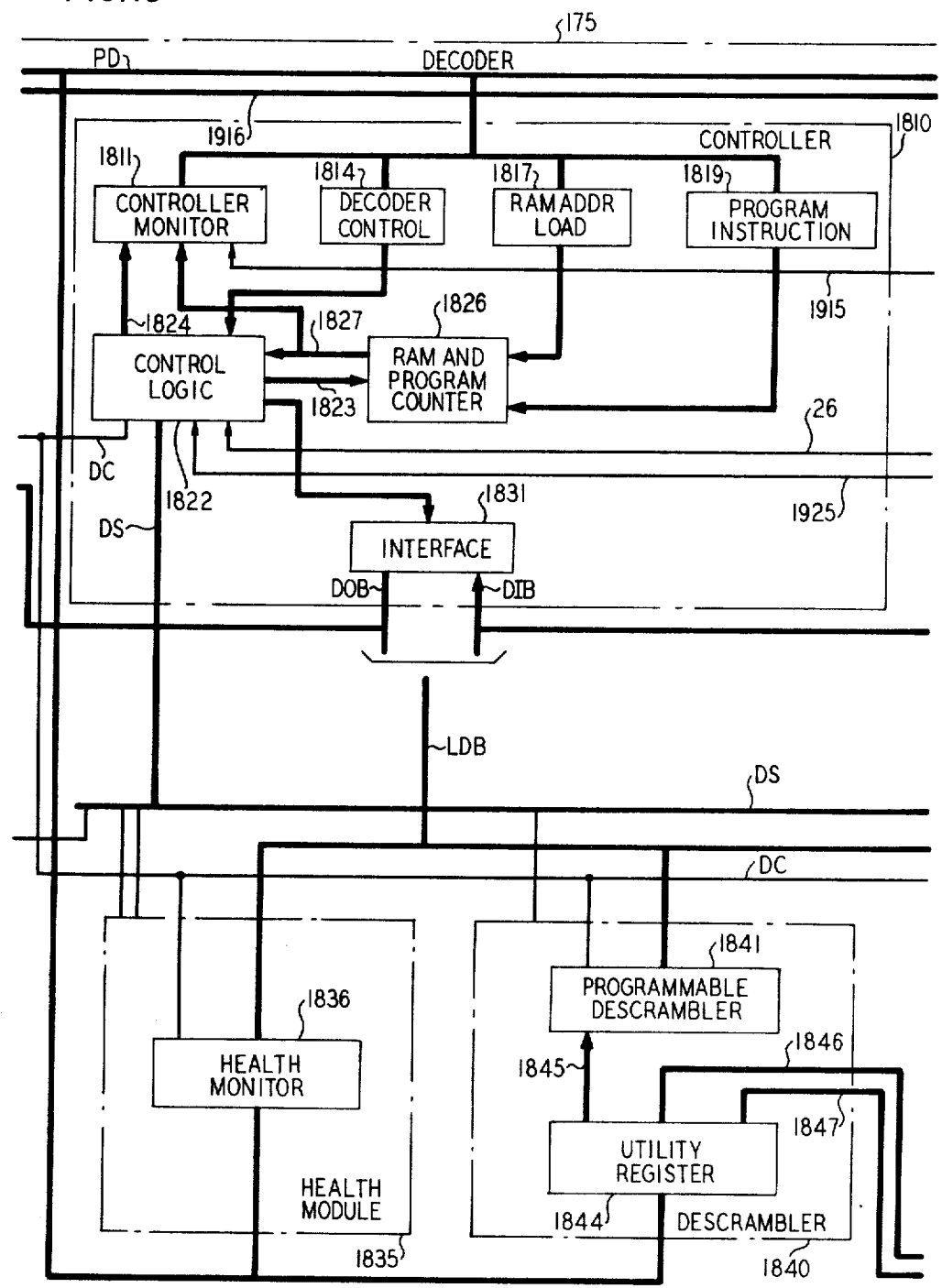
Figure 16:
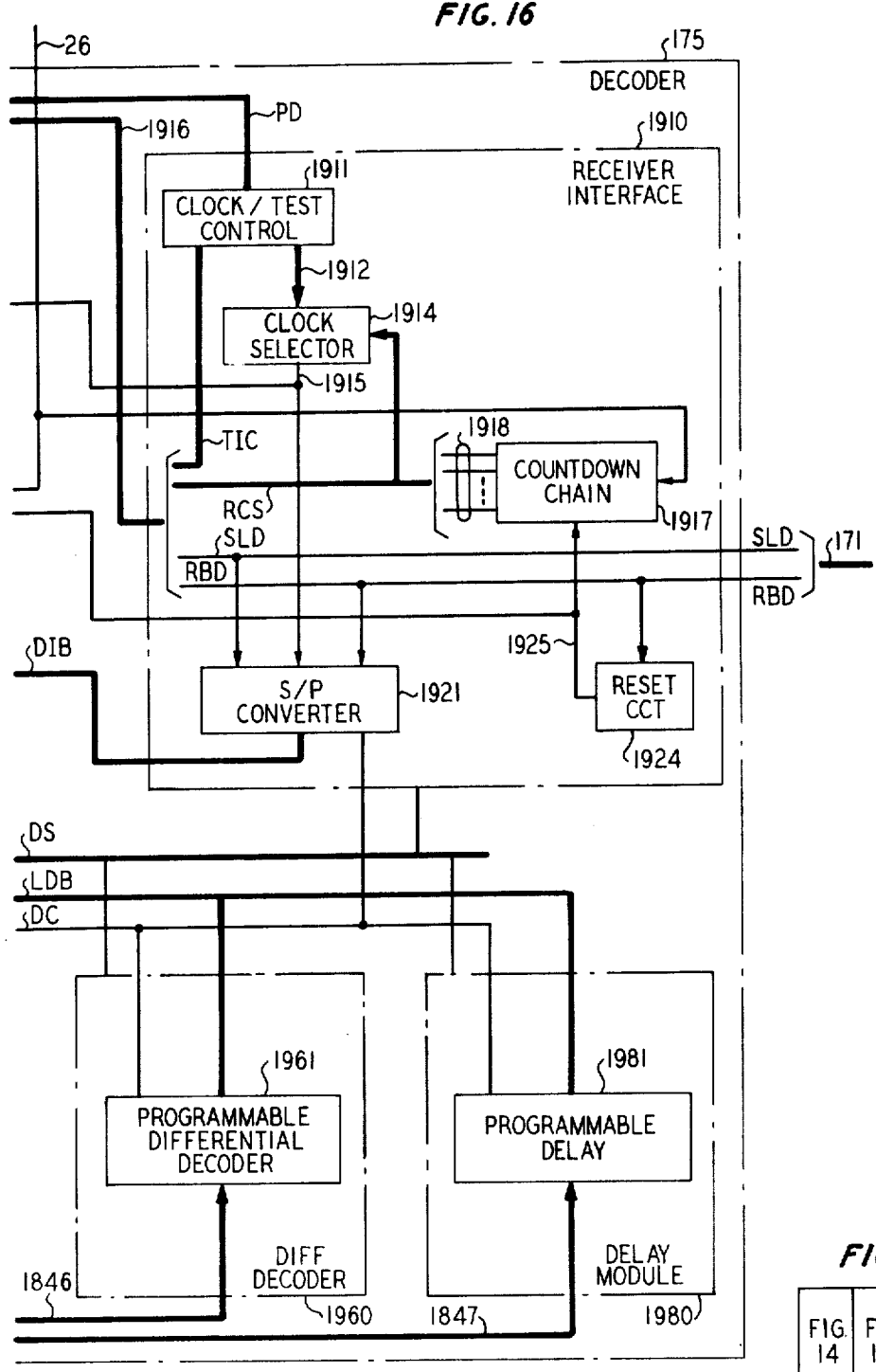
Figure 17:
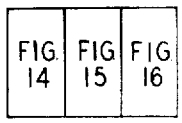

FIGS. 10-12, when arranged as shown in FIG. 13, show encoder 115. FIGS. 14-16, when arranged as shown in FIG. 17, show decoder 175. Encoder 115 and decoder 175 each embody the principles of the present invention.

Encoder 115 and decoder 175 are designed to operate in data sets employing, for example, different scrambling and differential encoding algorithms, bit and baud rates, modulation formats, etc. These circuits, moreover, can be used in data sets which operate over the switched telephone network or private line networks, the latter including both extended and nonextended networks. The encoder and decoder circuits, moreover, include arrangements which allow up to four 2400 bps data signals to be multiplexed at the transmitting end, transmitted at 9600 bps and demultiplexed at the receiving end.

Data set 10 operates on a nonextended private line on a nonmultiplexed basis. It uses 8-phase PSK. In order to simplify the ensuing description, circuitry within the encoder and decoder circuits which is not required to effect this mode of operation of data set 10 is not shown or described herein. Thus, circuitry relating to the following, for example, is not discussed: multiplexing and demultiplexing; the generation of QAM constellations; elastic data storage (which is used in extended networks).

All three primary buses, address bus PA, control bus PC and data bus PD, as well as a respective lead from chip select cable PSC, extend to each LSI circuit (or in the case of circuitry 170 one of the LSI circuits therein).

As shown in the FIGS. which depict the encoder and decoder, in particular, bus PD extends directly to and from each of the encoder and decoder registers with which controller 30 communicates. For purposes of drawing simplicity, the FIGS. do not show controller interface circuitry, to which buses PA and PC and the chip select lead extend in both the encoder and decoder. (The chip select leads extending to the encoder and decoder are designated CS1 and CS4, respectively.) This circuitry, however, is of conventional design. It responds to an enable signal on the chip select lead to operate the register whose address is then on bus PA. In particular, the controller interface circuitry causes information to be written into the register from bus PD when the write lead of control bus PC is enabled and causes information to be read from the register onto bus PD when the read lead of bus PC is enabled.

In a similar vein, it is to be noted that most of the LSI circuit registers which communicate with controller 30 are capable of holding eight bits of information. For the most part, the function of those bits which do not relate to the operation of data set 10, as configured, are, again, not discussed herein.

Encoder

In accordance with the present invention, encoder 115 is comprised of a plurality of modules. These include terminal interface 1310, which is the encoder input module, health monitor 1340, scrambler 1440, differential encoder 1460, which are encoder intermediate modules, and modulator interface 1540, which is the encoder output module. The encoder also includes a clock generator 1580.

Each module performs at least one predetermined function. The modules operate in a selected sequence with signals passing from one module to the next via a local encoder bus LEB comprised of encoder inbound bus EIB and encoder outbound bus EOB.

The function provided by the several modules are as follows: Terminal interface 1310 provides in parallel form data words to be processed by the other modules. Scrambler 1440 and differential encoder 1460 provide scrambling and differential encoding functions. Health module 1340 stores signals generated by the other modules, which stored signals can be examined by controller 30 to check that the encoder is operating properly. Modulator interface 1540 converts the encoded data words to serial form for application to modulator 120.

Terminal interface 1310, scrambler 1440 and differential encoder 1460 are each capable of performing their respective functions in accordance with a plurality of predetermined formats. In particular, interface 1310 can provide as its output word (a) user-provided data, (b) marks, (c) spaces, (d) pseudo-random words or (e) ideal reference (start-up) or other data "jammed" into the encoder from controller 30. Scrambler 1440 is capable of scrambling signals in accordance with both Bell System and CCITT standard scrambling algorithms for both 4800 and 9600 bit per second (bps) transmission, as well as in accordance with various Bell System and CCITT fallback scrambling algorithms. Similarly, differential encoder 1460 is capable of differentially encoding signals in accordance with both Bell System and CCITT standard and fallback differential encoding algorithms for 2400, 4800 and 9600 bps transmission. In addition, modulator interface 1540 may include circuitry for generating various QAM signal constellations. Such constellation-generating circuitry is not shown in the drawing because it is not used in data set 10. The particular formats to be respectively used by terminal interface 1310, scrambler 1440 and differential encoder 1460 at any point in time are specified by controller 30 by writing appropriate signals into various registers within the modules via bus PD.

The sequence in which the modules operate is controlled by local controller 1410. Individual select leads are extended from controller 1410 to each module via encoder select cable ES, with two select leads going to health module 1340 and one to each of the others. In addition, controller 1410 provides clock signals to health module 1340, scrambler 1440 and differential encoder 1460 over encoder clock lead EC.

At the beginning of each transmitter baud interval, controller 1410 accesses, i.e., enables the select lead of, terminal interface 1310. The latter, in response, provides on bus EIB a four-bit word comprised of data bits provided either by the user or generated within the data set. (Since data set 10 transmits three bits per baud, only three of the four bits on the four-bit word will have been derived from the user, the fourth bit being a "don't-care" bit.) Controller 1410 thereafter accesses modules 1340, 1440 and 1460 in a predetermined sequence. As each of these intermediate modules is accessed, it reads from bus EOB the four-bit word previously stored in controller 1410. The module processes that word in response to clock pulses on lead EC and returns the processed word to controller 1410 over bus EIB. When the desired processing has been completed, controller 1410 accesses modulator interface 1540, which reads in the processed four-bit word from bus EOB and extends it in serial form to modulator 120 over lead SDA—one of the leads of cable 116.

Controller 1410 includes RAM/program counter (hereinafter referred to as RAM) 1426, control logic 1422, interface 1431, and registerss 1411, 1414, 1417 and 1419. During data set initialization, controller 30 sets a configure bit in register 1414 indicating that controller 1410 is to be in a configure mode. This bit, as well as three other bits of register 1414, is extended to control logic 1422. The latter, which receives the clock signal from primary master clock 25 over lead 26, responds to the set state of the configure bit by extending a signal to RAM 1426 over a lead of cable 1423, indicating that the RAM is to load successive program instructions placed in register 1419 by controller 30 into the RAM location placed by controller 30 in register 1417. Both registers 1417 and 1419 are operated in an unbuffered mode at this time. That is, whenever information is loaded into them, it passes immediately to RAM 1426.

In accordance with a feature of the invention, the instructions loaded into RAM 1426 represent a number of microprograms, each defining the order of operations to be performed within encoder 115 for different modes of encoder operation, e.g., transmitter start-up, normal data transmission, etc. Once the initialization of controller 1410 is complete, controller 30 clears the configure bit in register 1414 and writes into register 1417 the address of the first instruction of the program in RAM 1426 which governs encoder operation during transmitter start-up. This address is loaded into the program counter of RAM 1426.

When encoder 115 is to begin encoding, controller 30 sets a run bit within register 1414. The start of each baud interval is signaled to control logic 1422 via a 1600 Hz baud clock provided by clock generator 1580 (described below) over transmitter baud clock lead TBD. At the beginning of the next transmitter baud interval, control logic 1422 begins pulsing RAM 1426 over another lead of cable 1423, causing the program counter to increment, whereby successive instructions of the program being run are provided back to control logic 1422 over cable 1427. Each of these instructions includes two pieces of information-the module to be accessed and the number of clock pulses (from one to four) to be generated on lead EC. This information is decoded by the control logic, which enables the appropriate lead in select cable ES and generates the specified number of clocks on lead EC. Control logic 1422 also pulses interface 1431 over cable 1424 to control the flow of four-bit words from bus EIB and onto bus EOB.

The completion of the processing for a given baud interval is manifested to control logic 1422 via a so-called halt instruction in the program. Control logic 1422 responds thereto by (a) terminating the incrementing of the program counter and (b) signaling RAM 1426 to read into its program counter an address in register 1417. That address is the address of the first instruction of the next program to be run. As long as the encoder is in a particular operational mode, e.g., transmitter start-up, that address will be the same as was loaded into the program counter at the start of the previous baud interval.

Except during initialization, register 1417 is operated, in accordance with a feature of the invention, as a double buffered register. This means that the register is comprised of two sections—an outside section and an inside section. Information from controller 30 is written into the outside section but controller 1410 operates in response to information in the inside section. This arrangement advantageously allows controller 30 to write the starting address of a new RAM program to be executed without disturbing the current operation of controller 1410 and without the data set controller having to keep track of where the local controller is in its processing cycle. When it is desired to effect a transfer of information from the outside section to the inside section of the register, controller 30 clears a previously-set register write bit stored in register 1414. This is responded to by control logic 1422 at the beginning of the next baud interval by extending a transfer pulse to register 1417 (via a lead not shown), effecting the transfer of whatever information is in the outside section of the register into the inside section thereof.

Other registers (identified hereinbelow) which controller 30 writes into are double buffered. These registers also receive the transfer pulse from control logic 1422.

The values of the four bits in register 1414 (one of which has not yet been described) are extended not only to control logic 1422 but also to monitor register 1411 from which they can be read by controller 30 in order to verify that their values are correct. Register 1411 also holds the previously-described ID word for the encoder.

Terminal interface 1310 receives the request-to-send and send data signals from the RS and SD leads of EIA interface connector 17 via cable 109, selector 110 and cable 111. (Although the input leads to this module are not actually the RS and SD leads of the interface connector, they are labeled as such in FIG. 10 to help the reader follow the signal flow.)

The request-to-send signal is received by a clamp and invert circuit 1317 which, as a function of the states of two bits in double-buffered register 1311, clamps the request-to-send signal, inverts it, or passes it through unchanged. The output of circuit 1317 extends to transition detector 1319, an output of which is request-to-send interrupt lead 118. The state of the request-to-send signal is monitored by controller 30 via a bit in monitor register 1314. Another bit in that register is controlled by transition detector 1319 over lead 1320; that bit is set for one baud interval following a request-to-send transition and is thereafter cleared. To this end, detector 1319 receives the baud clock from clock generator 1580 over lead TBD.

The send data signal is received by data input circuit 1331. This circuit also receives serial bit streams from pseudo-random word (PRW) generator 1339 over lead 1340 and from jam data buffer 1328 over lead 1329. The jam data buffer includes an 8-bit register and associated control circuitry.

The operation of circuit 1331, buffer 1328 and generator 1339 is controlled by information in double-buffered register 1322. In particular, two bits in register 1322, provided on cable 1324, determine whether circuit 1331 will take as its input signal user-provided data from the SD lead, ideal reference or other data from buffer 1328 (loaded into the buffer from controller 30) or a pseudo-random word from generator 1339, the latter being used as part of certain tests. Another two bits from this register extend to generator 1339 via cable 1326. One of them indicates whether a 15- or 511-bit word is to be applied to circuit 1331. The other bit causes generator 1339 to inject a single bit error in the pseudo-random word (so that the error-detecting capability of the far end data set can be tested). Another bit of register 1322 extends to buffer 1328 via lead 1323. This bit is always in the set state in data set 10 and indicates to the buffer that it is to operate in a parallel-to-serial mode.

The output of circuit 1331 extends to data clamp/invert circuit 1334 which provides a similar function to circuit 1317 and which is controlled by two bits in double-buffered register 1325. Those two bits, in conjunction with bits in register 1322, as previously described, determine what the output signal of interface 1310 will be, i.e., user-provided data, marks, spaces, pseudo-random words or ideal reference data. The output of circuit 1334 is extended to serial/parallel (S/P) converter 1337 which provides the data in parallel form onto bus EIB when terminal interface 1310 is accessed. Circuits 1331 and 1337, buffer 1328 and generator 1339 all receive from clock generator 1580 a 4800 Hz bit clock via transmitter bit clock lead TBT.

Two signals from terminal interface 1310 are extended via cable 1336 to monitor register 1589 in clock generator 1580 where they can be monitored by controller 30. One of these is a signal from buffer 1328 on lead 1330 indicating when it is empty and thus able to accept new data. The other is a tap off of the output of circuit 1334 on lead 1335.

Health module 1340 is essentially comprised of a health monitor register 1344. The function of this module is to store four-bit words generated by the other modules in the course of the encoding process. Each four-bit half of register 1344 has its own select lead in cable ES. Thus each half can be accessed independently by controller 1410 to store a respective four-bit word. The words stored in register 1344 are examined by controller 30 to check that the encoder is operating properly. If, for example, the two halves of register 1344 are respectively accessed by controller 1410 before and after scrambler 1440 is accessed, the two words stored in register 1344 will be the scrambler input and output. These can be compared by controller 30 to verify that the scrambler is operating properly.

Register 1344 is the only encoder register read by controller 30 which is double buffered. As long as a register read bit in register 1414 is set, there is no transfer of information from the inside section of register 1344 to its outside section. When the register read bit is cleared, however, this register, like the other double-buffered registers, receives a pulse from control logic 1422 (via a lead not shown) at the beginning of each baud interval to effect the transfer.

Scrambler module 1440 is comprised of a programmable scrambler circuit 1441 and double-buffered register 1444. Programmable scrambler circuit 1441 includes the circuitry necessary to implement the abovementioned CCITT and Bell System scrambling algorithms. Four bits from register 1444, extended to circuit 1441 over cable 1445, indicate which of these scrambling algorithms will be used and also provide scrambler clearing.

Differential encoder module 1460 is comprised of a programmable differential encoder circuit 1461 and a double-buffered register 1464. Programmable differential encoder circuit 1461 includes the circuitry necessary to implement the above-mentioned CCITT and Bell System differential encoding algorithms. Four bits from register 1464, extended to circuit 1461 over cable 1465, indicate which differential encoding algorithm will be used and also provide differential encoder clearing.

Modulator interface module 1540 includes parallel/serial (P/S) converter 1544, new data ready (NDR) clock 1548 and a monitor register 1541. In each baud interval, converter 1544 receives from controller 1410 on bus EOB a four-bit word representing the phase to be imparted to the transmitted carrier by modulator 120. At the start of the next baud interval, while terminal interface 1310 is providing to controller 1410 the next four-bit word to be encoded, modulator interface 1540 shifts the four bits theretofore loaded into it out to modulator 120 via lead SDA of cable 116. To effect this, converter 1544 receives the transmitter baud clock from lead TBD and a 9600 Hz line signal clock provided by clock generator 1580 on lead LSC. The latter also extends to modulator 120.

NDR clock 1548 receives the clocks on leads TBD and LSC. When all four bits have been shifted out to modulator 120 from converter 1544, NDR clock 1548 provides an indication of this to the modulator via a pulse on lead NDR of cable 116.

Taps off of leads SDA and NDR and cable 1427 (in controller 1410) are extended to monitor register 1541 for examination by controller 30.

As noted above, encoder 115 further includes a clock generator 1580. This circuit is comprised of a phase-locked loop 1581, countdown chain 1584, double-buffered register 1587 and monitor register 1589. Phase-locked loop 1581 provides to countdown chain 1584 a 28.8 kHz signal which, in normal data set operation, is either generated internally in response to the master clock signal on lead 26 or is phase locked to a user-provided 4800 Hz signal on the TT lead of interface connector 17. In loopback test modes, the output signal of phase locked loop 1581 is phase locked to the 1600 Hz baud clock generated by decoder 175 and extended to encoder 115 over lead 179. Three bits from register 1587 determine which of these timing sources will be used.

The baud and bit clock frequencies generated by countdown chain 1584 in response to the phase-locked loop output are determined by two bits from register 1444, provided on cable 1446 within cable 1467, and four bits from register 1464, provided on cable 1466 within cable 1467. (The reason so many bits are used relates to the fact that the countdown chain can be operated in numerous modes when encoder 115 is used in data sets which have multiplexing capability.) The 4800 Hz bit clock, in addition to being provided internally within the encoder over lead TBT, is also extended to the ST lead of interface converter 17 over lead 117, as previously described.

Register 1589, in addition to the aforementioned two signals received from terminal interface 1310 over cable 1336, receives taps off the baud and bit clock leads for monitoring by controller 30.

Decoder

The architecture of decoder 175 is similar to that of encoder 115. It includes, in particular, a local controller 1810 which controls six modules. These include receiver interface 1910, which is the decoder input module, health monitor 1835, descrambler 1840, differential decoder 1960, and delay module 1980, which are decoder intermediate modules and terminal interface 1710, which is the decoder output module.

Controller 1810 is very similar to controller 1410 of encoder 115. It includes a RAM/program counter (hereinafter referred to as RAM) 1826, which operates in response to control logic 1822. The latter converts microprogram instructions received from RAM 1826 into (a) select signals over decoder select cable DS and (b) clock signals on decoder clock lead DC. The signals on these leads cause each of the signal processing modules to operate on four-bit words provided from interface 1831 of controller 1810 onto decoder outgoing data bus DOB and to return the processed words to interface 1831 via decoder incoming data bus DIB. Buses DOB and DIB comprise respective portions of local decoder bus LDB.

Also similar to operations in controller 1410, program instructions are loaded into RAM 1826 from controller 30 via register 1819. RAM addresses, both for initial program instruction loading and subsequent program counter loading, are provided via register 1817. (The latter is operated in a double-buffered mode for program counter loading). Configure, run, register read and register write bits are provided by controller 30 via register 1814.

Monitor register 1811 provides a different function from register 1411 of controller 1410. Via one of the bits of register 1811, controller 30 monitors the signal on lead 1915 of receiver interface 1910 used by the latter to clock in serial data from circuit 170. Two other bits for register 1811 are taken from control logic 1822 via cable 1824. One of those two bits indicates that controller 1810 has completed its processing for the current baud interval. The other bit taken from control logic 1822 monitors the signal with which the control logic initiates via a lead in cable 1823 each RAM instruction read. The five other bits of register 1811 monitor the RAM output on cable 1827.

Descrambler 1840 and differential decoder 1960 respectively provide the inverse functions of scrambler 1440 and differential encoder 1460 of encoder 115. Descrambler 1840 includes a programmable descrambler 1841, the operating mode of which is specified by controller 30 via three bits from double-buffered register 1844 over cable 1845. The operating mode of a programmable differential decoder 1961 within differential decoder 1960 is controlled by two other bits of register 1844, provided over cable 1846.

The other two bits of register 1844 extend via cable 1847 to a programmable delay 1981 within delay module 1980. In certain applications, a user's terminal equipment may not be able to tolerate the erroneous "data" bits which are generated during receiver turn-off. In such applications, module 1980 provides a delay in the bit stream provided to the user of either 15 or 21 bits (as determined from controller 30). When the RR (receiver ready) lead is dropped at the end of a transmission, the above-mentioned erroneous bits are still within module 1980 and thus are never extended to the user.

Health module 1835, which is principally comprised of double-buffered health monitor register 1836, operates in the same manner, and provides the same function, as health module 1340 of encoder 115.

Receiver interface 1910 is comprised of a clock selector 1914, countdown chain 1917, serial/parallel (S/P) converter 1921 and double-buffered register 1911. This module may be thought of as an input module for the decoder. It receives the signals extended to decoder 175 by receiver processing and equalization circuit 170 via cable 171. Cable 171, in particular, carries two signals; sliced data on lead SLD and the receiver baud clock on lead RBD.

Countdown chain 1917, operative in response to the master clock signal on lead 26, generates numerous clock signals on its output leads 1918, with the countdown chain being reset in response to a reset signal from reset circuit 1924 on lead 1925. The latter, in turn, generates the reset signal in response to the positive edge of the baud clock on lead RBD. (The reset signal also resets control logic 1822). The signal on each of leads 1918 has a different frequency from 1200 to 9600 Hz. Various ones of these signals are used in different ones of the data sets which decoder 175 is designed to operate in. Leads 1918 extend to clock selector 1914 via cable RCS. Two bits from register 1911 on cable 1912 indicate to selector 1914 which of the clock signals from the countdown chain is to be used to clock in the sliced data on lead SLD. In the present example, as already noted, the frequency of the selected clock signal is 4800 Hz.

The 4800 Hz signal is extended over lead 1915 to serial/parallel (S/P) converter 1921. This signal is used to clock in three bits per baud interval from lead SLD. At the beginning of each baud interval, the bits shifted into converter 1921 during the previous baud interval are loaded in response to a clock pulse on lead DC into a register within S/P converter 1921 from which they are read by controller 1810 via bus DIB.

A cable 1916 carries a number of signals from receiver interface 1910 to terminal interface 1710. These include the signals on leads RBD and SLD and cable RCS. Also included in cable 1916 is a cable TIC, which carries signals from register 1911.

Terminal interface 1710 receives over bus DOB from controller 1810 fully-decoded data bits formatted in three-bit words, which are loaded into P/S converter 1729 in response to a clock signal on lead DC. Converter 1729 receives baud and bit clocks from cable RCS via clock selector 1726 and leads 1727 and 1728, respectively. The particular ones of the cable RCS signals to be applied to leads 1727 and 1728 are indicated to selector 1726 by controller 30 via bits in double-buffered register 1723.

The serial output bits of parallel/serial converter 1729 are provided on lead 1730. From there, they extend to RD clamp 1714 which, depending on a bit in double-buffered register 1711 on lead 1712, either passes the data bits through to decoder output lead 176 or clamps that lead high. Another bit in register 1711, provided on lead 1713, controls RR (receiver ready) latch 1717, the output of which is decoder output lead 182.

The baud and bit clocks on leads 1727 and 1728, respectively, are provided on decoder output leads 179 and 174, respectively. These two signals, as well as the data bit stream itself, are also extended to monitor register 1721 for inspection by controller 30. The bit stream on lead 1730 and the bit clock on lead 1728 also extend to pseudo-random word (PRW) comparator and error counter (hereinafter referred to as PRW comparator) 1738, word trap 1734 and data buffer 1756.

More particularly, PRW comparator 1738 operates during various tests to (a) compare the received bits to a known pseudo-random word transmitted repetitively from the far end data set or (b) determine in a so-called data set self test whether the data stream is comprised of all bits in the set state. The number of transmission errors detected is counted within comparator 1738 and is provided to controller 30 via double-buffered monitor register 1741. Three bits from register 1911 (in receiver interface 1910) extend to PRW comparator 1738 via cable TIC-a portion of cable 1916. Two of these bits determine whether the received data stream will be examined for a 15-bit pseudo-random word, a 511-bit pseudo-random word or the stream of bits all in the set state. Another bit is used to clear the error counter within element 1738.

Word trap 1734 generates the above-described word trap interrupt on lead 177 when a particular word loaded into register 1731 by controller 30 is detected in the bit stream on lead 1730. The word trap indication is held in a latch within the word trap, that latch being reset upon the writing of a new word into register 1731. Register 1731 is illustratively comprised of two eight-bit registers so that a word of up to sixteen bits can be matched to. The actual number of bits from register 1731 can be used in performing the matching is indicated to word trap 1734 by controller 30 via three bits of register 1746 on cable 1747.

Counter 1749 and data buffer 1756 provide controller 30 with the ability to examine in parallel eight bits of the serial bit stream, with the bits being framed in response to the occurrence of a match signaled by word trap 1734. In operation, the lead 1730 bit stream is clocked serially into buffer 1756. The occurrence of a match, as signaled by a pulse on lead 1735, resets counter 1749. After eight bit clock pulses from lead 1728, counter 1749 pulses data register 1752 over lead 1751, causing it to load the eight bits then in buffer 1756 into register 1752. A bit from register 1746 on lead 1748, when set, inhibits counter 1749 from resetting in response to a word trap match. This prevents an erroneous resetting of the counter should a stream of bits in the received data happen to match the word in register 1731.

Four bits of monitor register 1743 provide the ID word for the decoder. Two other bits carry the signals on leads RBD and SLD. One other bit extends from word trap 1734 on lead 177. Another bit of register 1743, provided on lead 1753 by control circuitry associated with register 1752, is set when register 1752 is loaded with new data and cleared when that register is read.

SECONDARY CHANNEL CIRCUITRY

As previously indicated, the secondary channel circuitry—also referred to as the Data Set Diagnostic Unit (DDU)—is controlled by a controller 50. Controller 50 is structured similarly to controller 30. It includes a microprocessor 510, ROM 515, RAM 520, timer circuitry 525, interrupt controller 530 and chip select decoder 535. Controller 50 communicates with its peripherals and the rest of the DDU—secondary signal processing circuitry 40, diagnostic channel circuitry 70 and secondary I/O circuitry 90—via secondary address bus SA, control bus SC, data bus SD and chip select cable SCS. The latter is comprised of the output leads 536 of decoder 535.

Secondary signal processing circuitry 40, as previously noted, receives the output of preamplifier 16. Within circuitry 40, the signal is received by secondary channel filter 405 which removes the primary channel receive signal and passes the FSK secondary channel receive signal to receiver 410. The latter provides an output pulse on lead 411 in response to each zero crossing of the FSK channel. These zero crossing indications are extended to microprocessor 510 via interrupt controller 530 and interrupt lead 531. The microprocessor recovers the secondary channel intelligence by measuring through an algorithm which includes measuring of the time intervals between successive zero crossing interrupts. It does this with the aid of timer 525b, from which a count is read on bus SD. (Also operating in a divide-by-N mode is timer 525c, the interrupts of which define a 110 baud clock for the secondary channel).

Secondary channel transmitter 415 receives from controller 50 information to be transmitted over the secondary channel. Transmitter 415 is illustratively an FSK transmitter which implements the inventions disclosed in U.S. Pat. Nos. 4,170,764 issued Oct. 9, 1979, to J. Salz et al and 3,801,807 issued Apr. 2, 1974 to J. Condon. The output of transmitter 415 passes to adder 15 via lead 146. Signals from which the frequencies of the two FSK tones are derived are provided to transmitter 415 from timer 525a via one of leads 526.

Secondary I/O circuit 90 includes a pair of latches 91, one-shot 93 and LED 94. The outputs of latches 91 extend to transmitter 415 over cable 92. One of these latch outputs turns transmitter 415 on and off. The other latch output determines which of two predetermined amplitudes the tone currently being transmitted by transmitter 415 is to have; as described in the Salz et al patent, the higher frequency tone has a smaller amplitude than the lower frequency tone. One-shot 93 is pulsed by controller 50 whenever a complete message has been transmitted or received on the secondary (diagnostic) channel. This causes a blinking of diagnostic channel indicator 94 on front panel 701.

Tests and commands can be initiated by the user not only from the front panel, but via diagnostic control device (DCD) 75 which is physically distinct from the data set. The DCD communicates with controller 50 asynchronously via diagnostic channel circuitry 70. The latter includes a DCD interface 71 and universal asynchronous receiver and transmitter (UART) 72 which formats and de-formats the asynchronous data. A clock for UART 72 is provided from timer 525f. Timers 525d and 525e are used for general purpose interrupt timing.

The secondary channel circuitry, or DDU, performs three basic functions—DDU background diagnostics, network health monitoring and message routing. The DDU background diagnostics include various checks of the circuitry within the DDU to ascertain that it is operating properly. These checks are similar to ones performed on the primary side of the data set. Network health monitoring includes the polling of the downstream network (comprised, in this example, of a single data set) to obtain information as to how it is functioning—its so-called "health." It also includes the receipt of health information from the primary channel circuitry. All of this health information is held in RAM 520 and is provided to the primary channel circuitry and DCD 75 for display to the user.

The message routing function of the DDU provides for the orderly flow of messages among the primary channel circuitry (via interface 60), the network (via circuitry 40) and the DCD (via circuitry 70). The messages include such information as data set health, as mentioned above, the setting up and aborting of tests requested from front panel 701 or DCD 75 and the reporting of test results back to the front panel or DCD.

Although specific embodiments of our invention are shown and described herein, these merely illustrate the principles of the invention. Those skilled in the art will be able to devise numerous arrangements which, although not explicity shown or described herein, embody those principles, and thus do not depart from the spirit and scope of our invention.

We claim:

1. Signal processing apparatus comprised of
a plurality of registers, and
a first bus (PD) common to said registers, characterized by
a second bus (LEB or LDB),
a plurality of circuit means each operative for processing a signal received from said second bus in accordance with a respective selected one of a predetermined plurality of formats and for returning the processed signal to said second bus,
local controller means for operating said circuit means in a selected sequence, and
second controller means for writing information signals into ones of said registers via said first bus, ones of said information signals identifying respective ones of the selected formats.

2. The invention of claim 1 further comprised of input circuit means for providing an initial signal on said second bus.

3. Signal processing apparatus comprised of
a plurality of registers, and
a first bus (PD) common to said registers, characterized by
a second bus (LEB),
input circuit means operative for providing an initial signal on said second bus from a selected one of a predetermined plurality of sources,
a plurality of other circuit means each operative for processing a signal received from said second bus in accordance with a respective selected one of a predetermined plurality of formats and for returning the processed signal to said second bus,
local controller means for operating said input and other circuit means in a selected sequence, and
second controller means for writing information signals into ones of said registers via said first bus, at least one of said information signals identifying the selected source and at least one other of said information signals identifying a respective one of the selected formats.

4. Signal processing apparatus comprised of
a plurality of registers, and
a first bus (PD) common to said registers characterized by
a second bus (LEB),
a plurality of circuit means each operative for processing a signal received from said second bus in accordance with a respective selected one of a predetermined plurality of formats and for returning the processed signal to said second bus,
local controller means for operating said circuit means in a selected one of a predetermined plurality of sequences, and
second controller means for writing information signals into ones of said registers via said first bus, at least one of said information signals identifying said selected sequence and at least one other of said information signals identifying a respective one of the selected formats.

5. The invention of claim 4 further comprised of input circuit means operative for providing an initial signal on said second bus from a selected one of a plurality of sources, at least one other of said information signals identifying said selected source.

6. The invention of claims 1, 3, or 4 wherein at least one of said registers is double buffered.

7. The invention of claims 4 or 5 wherein others of said information signals comprise program instructions defining said plurality of sequences and wherein said local controller means includes means for storing said program instructions.

8. The invention of claims 1, 2, 3, 4 or 5 further comprised of output circuit means operative for providing as an output signal of said apparatus a signal derived from said second bus, said local controller means being adapted to operate said output circuit means at the end of said selected sequence.

9. Circuitry for use in a data set which processes user-provided data to generate transmit data signals, said circuitry being comprised of
signal processing means which includes a plurality of addressable registers
a bus (PD) common to said registers, and
controller means for addressing said registers and for writing into each register via said bus information signals which specify the manner in which said data are to be processed,
said signal processing means characterized by
a second bus (LEB),
input circuit means operative for providing said data on said second bus,
a plurality of intermediate circuit means, at least ones of said intermediate circuit means being operative for processing a signal received from said second bus in accordance with a signal processing format specified by respective ones of said information signals and for thereafter providing the processed signal on said second bus,
output circuit means operative for providing as an output signal of said signal processing means the signal provided on said second bus by an individual one of said intermediate circuit means, and means for operating said input, intermediate and output circuit means in a selected sequence.

10. The invention of claim 9 wherein at least one of said intermediate circuit means is capable of scrambling said signal received from said second bus in accordance with any of a predetermined plurality of scrambling algorithms and wherein an individual one of said respective information signals specifies a selected one of said algorithms.

11. The invention of claim 9 wherein at least one of said intermediate circuit means is capable of differentially encoding said signal received from said second bus in accordance with any of a predetermined plurality of differential encoding algorithms and wherein an individual one of said respective information signals specifies a selected one of said algorithms.

12. The invention of claims 9, 10 or 11 wherein at least one of said intermediate circuit means is comprised of means operative for storing a signal theretofore provided on said second bus by another of said circuit means and wherein said controller means is adapted to read said stored signal.

13. The invention of claim 12 wherein at least one of said registers is double buffered.

14. The invention of claims 9, 10 or 11 wherein said input circuit means includes means for providing on said second bus signals other than said data.

15. The invention of claims 9, 10 or 11 wherein said operating means is capable of operating said input, intermediate and output circuit means in any of at least two different sequences and wherein one of said information signals specifies said selected sequence.

16. The invention of claim 15 wherein others of said information signals embody said different sequences and wherein said operating means includes means for storing said others of said information signals.

17. The invention of claims 9, 10 or 11 wherein at least one of said registers is double buffered.

18. Circuitry for use in a data set which processes received data signals to recover far end data, said circuitry being comprised of
signal processing means which includes a plurality of addressable registers,
a bus (PD) common to said registers,
controller means for addressing said registers and for writing into each register via said bus information signals which specify the manner in which said data signals are to be processed,
said signal processing means characterized by
a second bus (LDB),
input circuit means for providing on said second bus signals derived from said received data signals,
a plurality of intermediate circuit means, at least ones of said intermediate circuit means being operative for processing a signal received from said second bus in accordance with a signal processing format specified by respective ones of said information signals and for thereafter providing the processed signal on said second bus,
output circuit means for providing as an output signal of said signal processing means the signal provided on said second bus by an individual one of said intermediate circuit means, and
means for operating said input, intermediate and output circuit means in a selected sequence.

19. The invention of claim 18 wherein at least one of said intermediate circuit means is capable of descrambling said signal received from said second bus in accordance with any of a predetermined plurality of descrambling algorithms and wherein an individual one of said respective information signals specifies a selected one of said algorithms.

20. The invention of claim 18 wherein at least one of said intermediate circuit means is capable of differentially decoding said signal received from said second bus in accordance with any of a predetermined plurality of differential decoding algorithms and wherein an individual one of said respective information signals specifies a selected one of said algorithms.

21. The invention of claims 18, 19 or 20 wherein at least one of said registers is double buffered.

22. The invention of claims 18, 19 or 20 wherein at least one of said intermediate circuit means is comprised of means operative for storing a signal theretofore provided on said second bus by another of said circuit means and wherein said controller means is adapted to read said stored signal.

23. The invention of claim 22 wherein at least one of said registers is double buffered.

24. The invention of claims 18, 19 or 20 wherein said operating means is capable of operating said input, intermediate and output circuit means in any of at least two different sequences and wherein one of said information signals specifies said selected sequence.

25. The invention of claim 24 wherein others of said information signals embody said different sequences and wherein said operating means includes means for storing said others of said information signals.

* * * * *